US009413256B2

(12) United States Patent
Tamura et al.

(10) Patent No.: US 9,413,256 B2
(45) Date of Patent: Aug. 9, 2016

(54) CONTROL DEVICE OF DC-DC CONVERTER

(71) Applicant: Hitachi Automotive Systems, Ltd., Hitachinaka-shi, Ibaraki (JP)

(72) Inventors: Hiroshi Tamura, Tokyo (JP); Kenji Kubo, Hitachinaka (JP); Takuma Ono, Hitachinaka (JP); Susumu Sato, Hitachinaka (JP); Satoshi Idei, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/766,577

(22) PCT Filed: Jan. 31, 2014

(86) PCT No.: PCT/JP2014/052193
§ 371 (c)(1),
(2) Date: Aug. 7, 2015

(87) PCT Pub. No.: WO2014/125936
PCT Pub. Date: Aug. 21, 2014

(65) Prior Publication Data
US 2015/0372606 A1    Dec. 24, 2015

(30) Foreign Application Priority Data
Feb. 15, 2013  (JP) ................. 2013-027261

(51) Int. Cl.
*H02M 3/335* (2006.01)
*B60L 3/00* (2006.01)
*B60L 7/16* (2006.01)
*B60L 15/20* (2006.01)

(52) U.S. Cl.
CPC ......... *H02M 3/33546* (2013.01); *B60L 3/0046* (2013.01); *B60L 7/16* (2013.01); *B60L 15/2045* (2013.01); *H02M 3/33584* (2013.01); *B60L 2210/10* (2013.01); *Y02T 10/645* (2013.01); *Y02T 10/7216* (2013.01); *Y02T 10/7283* (2013.01)

(58) Field of Classification Search
CPC ................... H02M 3/33584; H02M 3/33546
USPC ...................................... 363/21.04
See application file for complete search history.

(56) References Cited

U.S. PATENT DOCUMENTS 6,661,108 B1    12/2003  Yamada et al.
8,526,204 B2 *   9/2013  Goto ................ H02M 3/33592
                                                363/21.18

(Continued)

FOREIGN PATENT DOCUMENTS

JP    62-173901 A    7/1987
JP    2000-184508 A   6/2000

(Continued)

OTHER PUBLICATIONS

International Search Report (PCT/ISA/210) dated Apr. 28, 2014 with English translation (five pages).

*Primary Examiner* — Adolf Berhane
*Assistant Examiner* — Afework Demisse
(74) *Attorney, Agent, or Firm* — Crowell & Moring LLP

(57) ABSTRACT

An object is to suppress deterioration of a high-voltage side battery regardless of the magnitude of a load current. Provided is a control device of a DC-DC converter that is constituted by a primary side circuit that is electrically connected between an input side and a transformer, and a secondary side circuit that is electrically connected between an output side and the transformer. The control device includes a command generating unit 325 that sets an output current limiting value to a predetermined value on the basis of a detected input voltage, a duty generating unit 330 that calculates a duty configured to turn ON/OFF a switching element on the basis of the output current limiting value and a detected output current, and a switching signal generating unit 335 that generates a switching signal on the basis of the duty. The duty generating unit 330 generates the duty so that an output current is limited to the output current limiting value or less.

14 Claims, 13 Drawing Sheets

(56) References Cited

U.S. PATENT DOCUMENTS

2002/0027786 A1* 3/2002 Nakazawa ........ H02M 3/33507 363/21.05
2007/0007938 A1* 1/2007 Djenguerian ..... H02M 3/33507 323/284

FOREIGN PATENT DOCUMENTS

| JP | 2002-84749 A | 3/2002 |
|----|---|---|
| JP | 2011-223674 A | 11/2011 |
| JP | 2012-65545 A | 3/2012 |
| JP | 2012-249348 A | 12/2012 |

* cited by examiner

CONTROL DEVICE OF DC-DC CONVERTER

TECHNICAL FIELD

The present invention relates to a control device of a power converter, and more particularly, to a control device of a DC-DC converter capable of suppressing deterioration of a high-voltage side battery that is used.

BACKGROUND ART

As background art of this technical field, JP-A-62-173901 (PTL 1) can be exemplified. PTL 1 describes that an output voltage of a DC-DC converter is linearly reduced in accordance with a reduction in the voltage of a high-voltage side battery so as to suppress over-discharging of the high-voltage side battery, and thus deterioration of the high-voltage side battery is suppressed.

CITATION LIST

Patent Literature

PTL 1: JP-A-62-173901

SUMMARY OF INVENTION

Technical Problem

However, PTL 1 relates to a technology of controlling only an output voltage of the DC-DC converter, and thus it is difficult to control an input/output current of the DC-DC converter to a predetermined value. In a control method of the DC-DC converter, the magnitude of the input/output current of the DC-DC converter varies depending on the magnitude of a current (hereinafter, referred to as a load current) that is required for an auxiliary system load that is connected to a low-voltage side battery. That is, in PTL 1, in a case where the load current increases, a current, which is supplied from the high-voltage side battery to the load through the DC-DC converter increases, and thus over-discharging of the high-voltage side battery may not be suppressed in some cases. The invention has been made in consideration of the problem, and an object thereof is to provide a control device of a DC-DC converter which is capable of suppressing deterioration of a high-voltage side battery regardless of the magnitude of a load current.

Solution to Problem

The invention has adopted the following means in order to solve the above problems. According to an aspect of the invention, a control device of a DC-DC converter that is constituted by a primary side circuit that is electrically connected between an input side and a transformer, and a secondary side circuit that is electrically connected between an output side and the transformer, includes a command generating unit that sets an output current limiting value of the secondary side circuit to a predetermined value on the basis of a detected input voltage of the primary side circuit; a duty generating unit that calculates a duty configured to turn ON/OFF a switching element that constitutes the primary side circuit on the basis of the output current limiting value that is set by the command generating unit, and a detected output current of the secondary side circuit; and a switching signal generating unit that generates a switching signal of the primary side circuit on the basis of the duty that is calculated by the duty generating unit, in which the duty generating unit generates the duty in such a manner that the output current of the secondary side circuit is limited to the output current limiting value or less.

Advantageous Effects of Invention

The invention has the above-described configuration, and thus it is possible to suppress deterioration of a high-voltage side battery regardless of the magnitude of a load current.

DESCRIPTION OF EMBODIMENTS

Figure 1:
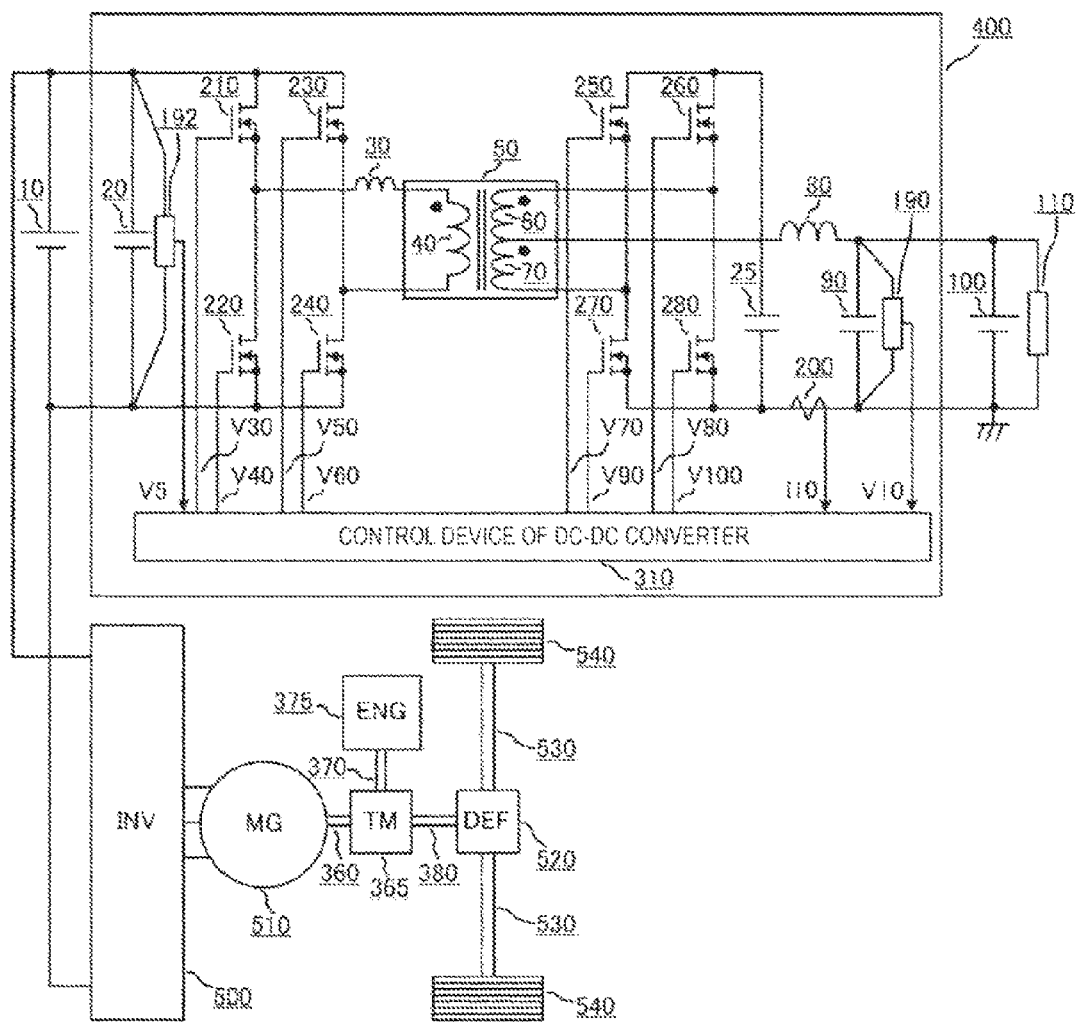
FIG. 1 is a view illustrating a hybrid vehicle system including a DC-DC converter 400 according to a first embodiment.

Hereinafter, embodiments of the invention will be described with reference to the accompanying drawings.
First Embodiment
(Hybrid Vehicle System Including DC-DC Converter)
FIG. 1 is a view illustrating a hybrid vehicle system including a DC-DC converter 400 according to a first embodiment of the invention. A primary side circuit of the DC-DC converter 400 and a direct current side of an inverter 500 are connected to a high-voltage side battery 10. As the high-voltage side battery 10, a nickel hydrogen storage battery, a lithium ion battery, and the like are used. A secondary side circuit of the DC-DC converter 400 is magnetically coupled to the primary side circuit through a transformer 50, and is connected to a low-voltage side battery 100 and an auxiliary system load 110 (hereinafter, referred to as a load 110) in parallel. As the low-voltage side battery 100, a lead storage battery and the like are employed.

A three-phase alternating current side of the inverter 500 is connected to a three-phase winding that is wound around a stator of a motor generator 510. The inverter 500 converts a DC voltage of the high-voltage side battery 10 into a three-phase alternating current with a variable voltage and a variable frequency in response to a torque command of the motor generator 510 which is received from a vehicle control device (not illustrated). The inverter 500 applies a three-phase AC voltage, which is converted, to the three-phase winding of the motor generator 510 to control a three-phase AC current that flows through the three-phase winding of the motor generator 510.

The motor generator 510 generates a rotating magnetic field by the three-phase AC current that flows through the three-phase winding that is wound around the stator, and generates the torque of the motor generator 510 by accelerating or decelerating rotation of a rotator by the rotating magnetic field that is generated. The generated torque of the motor generator 510 is transmitted to a transmission 365 through a motor generator shaft 360. It is preferable that the motor generator 510 that is mounted on a vehicle employs a permanent-magnet electric motor with a small size, high efficiency, and a high-output, but there is no problem in an induction motor, and the like.

An engine 375 controls intake, compression, explosion, and exhaust of a fuel in response to a torque command of the engine 375 which is received from a vehicle control device (not illustrated), thereby generating the torque of the engine 375. The generated torque of the engine 375 is transmitted to the transmission 365 through a crank shaft 370.

The transmission 365 transmits the total torque of the torque of the motor generator 510 and the torque of the engine 375, which are transmitted, to a differential gear 520 through a propeller shaft 380. The differential gear 520 converts the torque transmitted from the transmission 365 to drive shaft torque, and transmits the torque to a drive shaft 530. The drive shaft 530 accelerates or decelerates rotation of driving wheels 540 of a vehicle by the drive shaft torque that is transmitted, thereby accelerating or decelerating the vehicle (not illustrated).

In addition, the motor generator 510 converts the torque of the engine 375 which is transmitted to the motor generator shaft 360 through the transmission 365, into electric power, and the converted electric power can be charged in the high-voltage side battery 10 through the inverter 500. In addition, the motor generator 510 converts rotational energy of the driving wheel 540, which is transmitted to the motor generator shaft 360 sequentially through the drive shaft 530, the differential gear 520, the propeller shaft 380, and the transmission 365, into electric power, and the converted electric power can also be charged in the high-voltage side battery 10 through the inverter 500.

Here, an operation of supplying electric power from the high-voltage side battery 10 to the motor generator 510 through the inverter 500 is defined as a power-running operation, and an operation of charging the electric power, which is generated in the motor generator 510, in the high-voltage side battery 10, is defined as a regeneration operation. In the power-running operation, electric power is supplied from the high-voltage side battery 10 to the motor generator 510 (electric power is taken out from the high-voltage side battery 10), and thus the voltage of the high-voltage side battery 10 is reduced.

On the other hand, during the regeneration operation, the electric power that is generated in the motor generator 510 is charged in the high-voltage side battery 10, and thus the voltage of the high-voltage side battery 10 is raised. So as to suppress deterioration of the high-voltage side battery 10, it is necessary to prevent over-discharging or over-charging of the high-voltage side battery 10 by controlling the power-driving operation and the regeneration operation in a well-balanced manner. However, so as to realize low fuel consumption in a hybrid vehicle, it is preferable to maximize the use of the power-driving operation during departure or acceleration of the vehicle, and to maximize the use of a regeneration brake during deceleration of the vehicle, and thus there is a possibility that the high-voltage side battery 10 may enter an over-discharged or over-charged state. Accordingly, in the invention, the DC-DC converter 400, which is capable of suppressing over-discharging and over-charging of the high-voltage side battery 10, is provided.

The DC-DC converter 400 according to this embodiment includes a filter capacitor 20, a voltage sensor 192, MOSFETs 210, 220, 230, and 240, and a resonant inductor 30 in a primary side circuit. In the filter capacitor 20, one end of the filter capacitor 20 is connected to a high-potential side of the high-voltage battery 10, and the other end of the filter capacitor 20 is connected to a low-potential side of the high-voltage battery 10. In the voltage sensor 192, one end of the voltage sensor 192 is connected to the high-potential side of the high-voltage battery 10, and the other end of the voltage sensor 192 is connected to the low-potential side of the high-voltage battery 10.

The high-potential side of the high-voltage battery 10 is connected to a drain of the MOSFET 210 and a drain of the MOSFET 230. The low-potential side of the high-voltage battery 10 is connected to a source of the MOSFET 220 and a source of the MOSFET 240. A source of the MOSFET 210 is connected to a drain of the MOSFET 220, and one end of the resonant inductor 30. The other end of the resonant inductor 30 is connected to one end of a primary side winding 40 of the transformer 50. The other end of the primary side winding 40 of the transformer 50 is connected to a source of the MOSFET 230 and a drain of the MOSFET 240. Here, the resonant inductor 30 may be substituted with interconnection inductance or leakage inductance of the transformer 50.

The DC-DC converter 400 includes a smoothing capacitor 90, a smoothing inductor 80, a snubbing capacitor 25, a voltage sensor 190, a current sensor 200, and MOSFETs 250, 260, 270, and 280 in a secondary side circuit.

One end of a secondary side winding 60 of the transformer 50 is connected to a source of the MOSFET 260, and a drain of the MOSFET 280. The other end of the secondary side winding 60 of the transformer 50 is connected to one end of a secondary side winding 70 of the transformer 50, and one end of the smoothing inductor 80. The other end of the secondary side winding 70 of the transformer 50 is connected to a source of the MOSFET 250, and a drain of the MOSFET 270.

A drain of the MOSFET 250 and a drain of the MOSFET 260 are connected to one end of the snubbing capacitor 25. The other end of the snubbing capacitor 25 is connected to a source of the MOSFET 270, a source of the MOSFET 280, and one end of the current sensor 200.

The other end of the smoothing inductor 80 is connected to one end of the smoothing capacitor 90, and one end of the voltage sensor 190. The other end of the smoothing capacitor 90 and the other end of the voltage sensor 190 are connected to the other end of the current sensor 200.

A high-potential side of the low-voltage battery 100 is connected to the one end of the smoothing capacitor 90, the one end of the voltage sensor 190, and the other end of the smoothing inductor 80. A low-potential side of the low-voltage battery 100 is connected to the other end of the smoothing capacitor 90, the other end of the voltage sensor 190, the other end of the current sensor 200, and a chassis ground of a vehicle. In addition, one end of the load 110 is connected to the high-potential side of the low-voltage battery 100, and the other end of the load 110 is connected to the low-potential side of the low-voltage battery 100.

The DC-DC converter 400 includes the voltage sensor 192 that is connected to the high-voltage side battery 10 in parallel, the voltage sensor 190 that is connected to the low-voltage side battery 100 in parallel, and the current sensor 200 that is connected to the low-voltage side battery 100 in series. The voltage sensor 192 detects an input voltage V5 of the DC-DC converter 400. The voltage sensor 190 detects an output voltage V10 of the DC-DC converter 400. The current sensor 200 detects an output current I10 of the DC-DC converter 400.

The voltage sensors are constituted by non-inverting amplifiers using a voltage-dividing resistor and an operational amplifier, a differential amplifier, and the like. The current sensor is constituted by a shunt resistor, a hall element, and the like.

A control device 310 of the DC-DC converter 400 generates a gate voltage V30 configured to control ON/OFF of the MOSFET 210 that is a switching element of the DC-DC converter 400 on the basis of the input voltage V5, the output voltage V10, and the output current I10, and inputs the gate voltage V30 that is generated to a gate of the MOSFET 210. As described below, the control device 310 of the DC-DC converter 400 inputs a gate voltage V40 to a gate of the MOSFET 220, inputs a gate voltage V50 to a gate of the MOSFET 230, inputs a gate voltage V60 to a gate of the MOSFET 240, inputs a gate voltage V70 to a gate of the MOSFET 250, inputs a gate voltage V80 to a gate of the MOSFET 260, inputs a gate voltage V90 to a gate of the MOSFET 270, and inputs a gate voltage V100 to a gate of the MOSFET 280.

(Control Device 310 of DC-DC Converter)

Figure 2:
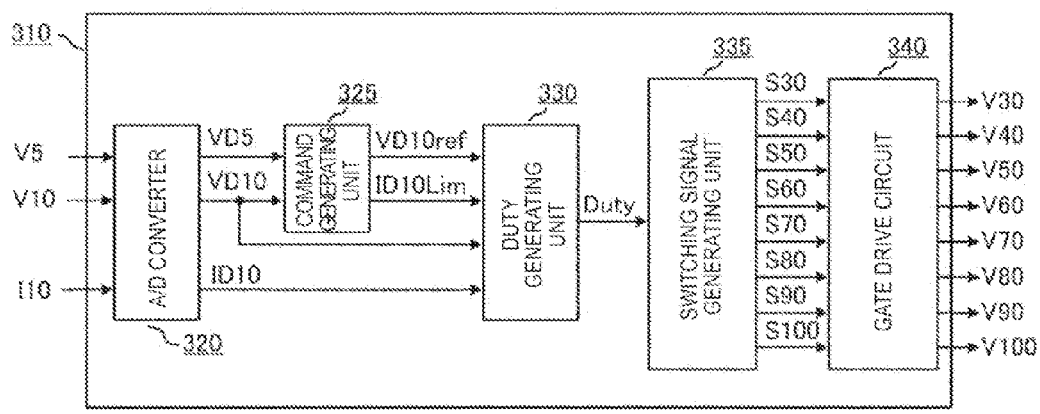
FIG. 2 is a view illustrating a control device 310 according to the first embodiment.

FIG. 2 is a view illustrating the control device 310 of the DC-DC converter 400 according to the first embodiment of the invention. The control device 310 of the DC-DC converter 400 includes an A/D converter 320 that converts an analog value into a digital value, a command generating unit 325, a duty generating unit 330, a switching signal generating unit 335, and a gate drive circuit 340.

The A/D converter 320 converts an analog value of the input voltage V5 of the DC-DC converter 400, which is detected by the voltage sensor 192, into a digital value VD5. In addition, the A/D converter 320 converts an analog value of the output voltage V10 of the DC-DC converter 400, which is detected by the voltage sensor 190, into a digital value VD10. In addition, the A/D converter 320 converts an analog value of the output current I10 of the DC-DC converter 400, which is detected by the current sensor 200, into a digital value ID10.

The command generating unit 325 generates an output voltage command VD10ref and an output current limiting value ID10Lim of the DC-DC converter 400 on the basis of the digital value VD5 (hereinafter, referred to as an input voltage VD5 of the DC-DC converter 400) that represents the input voltage V5 of the DC-DC converter 400 which is detected by the voltage sensor 192, and the digital value VD10 (hereinafter, referred to as an output voltage VD10 of the DC-DC converter 400) that represents the output voltage V10 of the DC-DC converter 400 which is detected by the voltage sensor 190.

The duty generating unit 330 generates a duty Duty of each of the MOSFETs 210, 220, 230, and 240 on the basis of the output voltage command VD10ref and the output current limiting value ID10Lim of the DC-DC converter 400 which are generated by the command generating unit 325, the output voltage VD10 of the DC-DC converter 400 which is output from the A/D converter 320, and the digital value ID10 (hereinafter, referred to as an output current ID10 of the DC-DC converter 400) that represents the output current I10.

The switching signal generating unit 335 generates ON/OFF signals S30, S40, S50, S60, S70, S80, S90, and S100 of the MOSFETs 210, 220, 230, 240, 250, 260, 270, and 280 of the DC-DC converter 400 on the basis of the duties Duty of the MOSFETs 210, 220, 230, and 240 of the DC-DC converter 400 which are generated by the duty generating unit 330.

The gate drive circuit 340 generates gate voltages V30, V40, V50, V60, V70, V80, V90, and V100 which are configured to turn on and turn off the MOSFETs 210, 220, 230, 240, 250, 260, 270, and 280 of the DC-DC converter 400 on the basis of the ON/OFF signals S30, S40, S50, S60, S70, S80, S90, and S100 of the MOSFETs 210, 220, 230, 240, 250, 260, 270, and 280 of the DC-DC converter 400 which are generated by the switching signal generating unit 335.

(Command Generating Unit 325))

Figure 3:
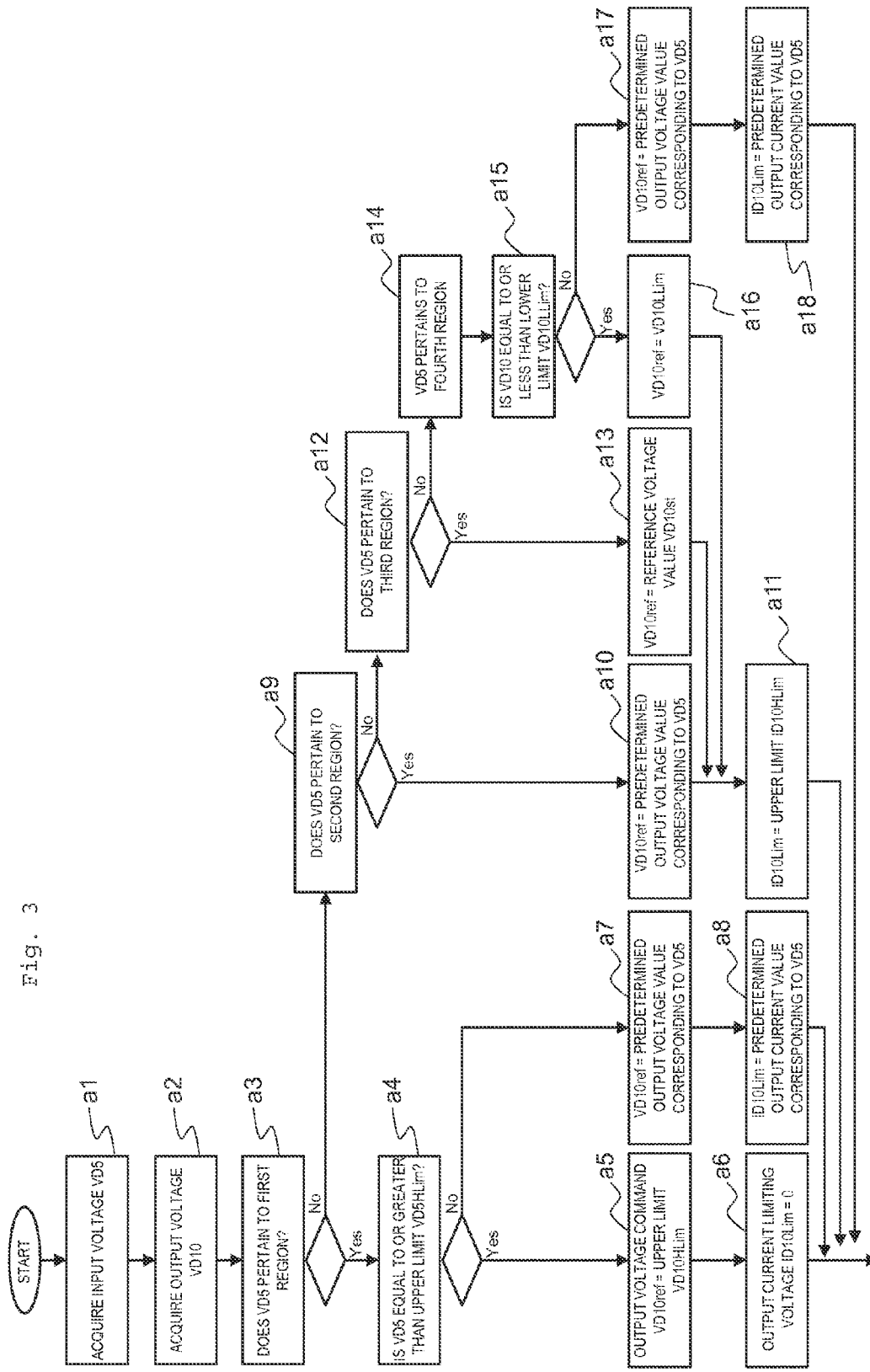
FIG. 3 is a view illustrating a command generating unit 325 according to the first embodiment.

FIG. 3 is a view illustrating the command generating unit 325 that is provided to the control device 310 of the DC-DC converter 400 according to the first embodiment of the invention. However, with regard to the input voltage VD5 of the DC-DC converter 400, the command generating unit 325 determines four regions in advance similar to Expression (1).

(Expression 1)

$$\text{First region} > \text{second region} > \text{third region} > \text{fourth region} \geq 0(\text{zero}) \quad (1)$$

That is, with regard to the input voltage VD5, a voltage value of 0 or greater is divided into four regions, and are determined as a first region, a second region, a third region, and a fourth region in this order from a great value side.

First, in step a1 illustrated in FIG. 3, the command generating unit 325 acquires the input voltage VD5 of the DC-DC converter 400 which is output from the A/D converter 320 (hereinafter, simply referred to as an input voltage VD5), and in step a2, acquires the output voltage VD10 of the DC-DC converter 400 (hereinafter, simply referred to as an output voltage VD10). Next, in step a3, the command generating unit 325 determines whether or not the input voltage VD5, which is acquired in step a1, pertains to the first region.

(In Case Where Input Voltage Pertains to First Region)

In a case where it is determined in step a3 that the input voltage VD5 pertains to the first region, in step a4, the command generating unit 325 determines whether or not the input voltage VD5 is equal to or greater than the upper limit VD5HLim that is determined in advance with respect to the input voltage VD5.

In a case where it is determined in step a4 that the input voltage VD5 is equal to or greater than the upper limit VD5HLim, in step a5, the command generating unit 325 sets the output voltage command VD10ref of the DC-DC converter 400 to the upper limit VD10HLim that is determined in advance with respect to the output voltage VD10. In addition, in step a6, the command generating unit 325 sets the output current limiting value ID10Lim to 0 (zero).

In addition, the command generating unit 325 inputs the output voltage command VD10ref that is set in step a5, and the output current limiting value ID10Lim that is set in step a6 to the duty command generating unit 330.

When the output current limiting value ID10Lim of the DC-DC converter 400 is set as described above, it is possible to turn off all of the MOSFETs 210 to 240 of the primary side circuit of the DC-DC converter 400 before the total voltage of the input voltage V5 and a surge voltage that occurs due to switching of the MOSFETs 210 to 240 exceeds a withstand voltage of the MOSFETs 210 to 240. In addition, it is possible to turn off all of the MOSFETs 250 to 280 before the total voltage of a voltage that is supplied to the secondary side circuit through the transformer 50, and a surge voltage that occurs due to switching of the MOSFETs 250 to 280 exceeds a withstand voltage of the MOSFETs 250 to 280. According to this, it is possible to prevent over-voltage breakdown of the MOSFETs 210 to 280.

On the other hand, in a case where it is determined in step a4 that the input voltage VD5 is less than the upper limit VD5HLim, in step a7, the command generating unit 325 sets the output voltage command VD10ref of the DC-DC converter 400 to a predetermined output voltage value corresponding to the input voltage VD5 that is acquired in step a1. In addition, in step a8, the command generating unit 325 sets the output current limiting value ID10Lim to a predetermined output current value corresponding to the input voltage VD5 that is acquired in step a1.

In addition, the command generating unit 325 inputs the output voltage command VD10ref that is set in step a7, and the output current limiting value ID10Lim that is set in step a8 to the duty command generating unit 330. However, the predetermined output voltage value, which is set as the output voltage command VD10ref of the DC-DC converter 400 is linearly raised with respect to the rising of the input voltage VD5, and is linearly lowered with respect to the lowering of the input voltage VD5. In addition, the predetermined output voltage value is set in advance in such a manner that an input voltage VD5 that is acquired becomes a value, which does not rapidly vary, during transition from a value less than the upper limit VD5HLim to a value equal to or greater than the upper limit VD5HLim, or during transition from the first region to the second region illustrated in Expression (1).

When the output voltage command VD10ref of the DC-DC converter 400 is set as described above, even in a case where the input voltage V5 of the DC-DC converter 400 varies, it is possible to suppress a rapid variation in the output voltage V10 of the DC-DC converter 400.

In addition, the predetermined output current value, which is set as the output current limiting value ID10Lim of the DC-DC converter 400, is linearly lowered with respect to the rising of the acquired input voltage VD5 of the DC-DC converter 400, and is linearly raised with respect to the lowering of the acquired input voltage VD5 of the DC-DC converter 400. In addition, the predetermined output current value is linearly changed from 0 (zero) to the upper limit ID10HLim that is determined in advance with respect to the output current ID10 of the DC-DC converter 400 (hereinafter, simply referred to as an output current ID10) in accordance with a variation in the acquired input voltage VD5 of the DC-DC converter 400.

When the output current limiting value ID10Lim of the DC-DC converter 400 is set as described above, even in a case where the input voltage V5 varies, it is possible to suppress a rapid variation in the output current I10. According to this, a de-rating operation of limiting the output current I10 can be stabilized, and thus reliability of the DC-DC converter 400 is improved.

(Case Where Input Voltage Pertains to Second Region)

On the other hand, in a case where it is determined in step a3 that the input voltage VD5 does not pertain to the first region, in step a9, the command generating unit 325 determines whether or not the input voltage VD5 pertains to the second region.

In a case where it is determined in step a9 that the input voltage VD5 pertains to the second region, that is, in a case where the high-voltage side battery 10 is very likely to enter an over-charged state, in step a10, the command generating unit 325 sets the output voltage command VD10ref of the DC-DC converter 400 to a predetermined output voltage value corresponding to the input voltage VD5. In addition, in step a11, the command generating unit 325 sets the output current limiting value ID10Lim to the upper limit ID10HLim.

In addition, the command generating unit 325 inputs the output voltage command VD10ref that is set in step a10, and the output current limiting value ID10Lim that is set in step a11 to the duty command generating unit 330. However, the output voltage value, which is set as the output voltage command VD10ref of the DC-DC converter 400, is linearly raised with respect to the rising of the input voltage VD5, and is linearly lowered with respect to the lowering of the input voltage VD5. In addition, the predetermined output voltage value is set in advance in such a manner that an input voltage VD5 that is acquired becomes a value, which does not rapidly vary, during transition from the second region to the first region, or during transition from the second region to the third region that is illustrated in Expression (1).

When the output voltage command VD10ref of the DC-DC converter 400 is set as described above, even in a case where the input voltage V5 of the DC-DC converter 400 varies, it is possible to suppress a rapid variation in the output voltage V10 of the DC-DC converter 400. In addition, the output current limiting value ID10Lim is set to the upper limit ID10HLim, and thus it is possible to raise the output current I10 of the DC-DC converter 400 in combination with the rising of the input voltage V5 of the DC-DC converter 400. That is, it is possible to increase electric power that is taken out from the high-voltage side battery 10 in combination with the rising of the input voltage V5 of the DC-DC converter 400, and thus it is possible to suppress the rising of the voltage of the high-voltage side battery 10. According to this, it is possible to suppress over-charging of the high-voltage side battery 10.

(In Case Where Input Voltage Pertains to Third Region)

On the other hand, in a case where it is determined in step a9 that the input voltage VD5 does not pertain to the second region, in step a12, the command generating unit 325 determines whether or not the input voltage VD5 pertains to the third region.

In a case where it is determined in step a12 that the input voltage VD5 pertains to the third region, that is, the high-voltage side battery 10 is less likely to enter an over-discharged or over-charged state, in step a13, the command generating unit 325 sets the output voltage command VD10ref of the DC-DC converter 400 to a reference voltage value VD10st that is determined in advance with respect to the output voltage VD10. In addition, in step a11, the command generating unit 325 sets the output current limiting value ID10Lim to the upper limit ID10HLim.

In addition, in step a13, the command generating unit 325 inputs the output voltage command VD10ref that is set in step a13, and the output current limiting value ID10Lim that is set in step a11 to the duty command generating unit 330. However, it is preferable that the reference voltage VD10st, which is set as the output voltage command VD10ref of the DC-DC converter 400, is set to a constant value, for example, 12 V and the like.

When the output voltage command VD10ref and the output current limiting value ID10Lim of the DC-DC converter 400 are set as described above, even in a case where the input voltage VD5 transitions from the third region to the second region, or transitions from the third region to the fourth region illustrated in Expression (1), it is possible to suppress a rapid variation of the output voltage V10. In addition, it is possible to prevent the high-voltage side battery 10 and the low-voltage side battery 100 from being over-discharged or over-charged.

(In Case Where Input Voltage Pertains to Fourth Region)

On the other hand, in a case where it is determined in step a12 that the input voltage VD5 does not pertain to the third region, in step a14, the command generating unit 325 determines that the input voltage VD5 pertains to the fourth region. That is, the command generating unit 325 determines that the high-voltage side battery 10 is very likely to enter an over-discharged state.

Next, in step a15, the command generating unit 325 determines whether or not the output voltage VD10 is equal to or less than the lower limit VD10LLim that is determined in advance with respect to the output voltage VD10.

In a case where it is determined in step a15 that the output voltage VD10 is equal to or less than the lower limit VD10LLim, in step a16, the command generating unit 325 sets the output voltage command VD10ref of the DC-DC converter 400 to the lower limit VD10LLim. In addition, in step a11, the command generating unit 325 sets the output current limiting value ID10Lim to the upper limit ID10HLim.

In addition, the command generating unit 325 inputs the output voltage command VD10ref that is set in step a16, and the output current limiting value ID10Lim that is set in step a11 to the duty command generating unit 330.

When the output voltage command VD10ref and the output current limiting value ID10Lim of the DC-DC converter 400 are set as described above, it is possible to prevent the low-voltage side battery 100 from being over-discharged. In a state of the input voltage V5 and the output voltage V10, it is preferable that the DC-DC converter 400 is controlled as described above to give priority to prevention of over-discharging of the low-voltage side battery 100, thereby avoiding the over-discharging of the high-voltage side battery 10 by the regeneration operation.

On the other hand, in a case where it is determined in step a15 that the output voltage VD10 is greater than the lower limit VD10LLim, in step a17, the command generating unit 325 sets the output voltage command VD10ref of the DC-DC converter 400 to a predetermined output voltage value corresponding to the input voltage VD5. In addition, in step a18, the command generating unit 325 sets the output current limiting value ID10Lim to a predetermined output current value corresponding to the input voltage VD5.

In addition, the command generating unit 325 inputs the output voltage command VD10ref that is set in step a17, and the output current limiting value ID10Lim that is set in step a18 to the duty command generating unit 330. However, the predetermined output voltage value, which is set as the output voltage command VD10ref of the DC-DC converter 400 is linearly raised with respect to the rising of the input voltage VD5, and is linearly lowered with respect to the lowering of the input voltage VD5. In addition, the predetermined output voltage value is set in advance in such a manner that an input voltage VD5 that is acquired becomes a value, which does not rapidly vary, during transition from the fourth region to the third region.

When the output voltage command VD10ref of the DC-DC converter 400 is set as described above, even in a case where the input voltage V5 rapidly varies, it is possible to suppress a rapid variation of the output voltage V10.

In addition, the predetermined output current value, which is set as the output current limiting value ID10Lim of the DC-DC converter 400, is linearly raised with respect to the rising of the input voltage VD5 that is acquired, and is linearly lowered with respect to the lowering of the input voltage VD5. In addition, the predetermined output current value is linearly changed from 0 (zero) to the upper limit ID10HLim in accordance to a variation in the input voltage VD5.

When the output current limiting value ID10Lim of the DC-DC converter 400 is set as described above, even in a case where the input voltage V5 varies, it is possible to suppress a rapid variation in the output current I10. In addition, it is possible to limit the output current I10 regardless of a variation in a load current, and thus it is possible to lower the output current I10 in combination with the lowering of the input voltage V5. That is, it is possible to reduce electric power that is taken out from the high-voltage side battery 10 in combination with the lowering of the input voltage V5 regardless of the magnitude of the load current, and thus it is possible to suppress over-discharging of the high-voltage side battery 10.

(Duty Generating Unit 330)

Figure 4:
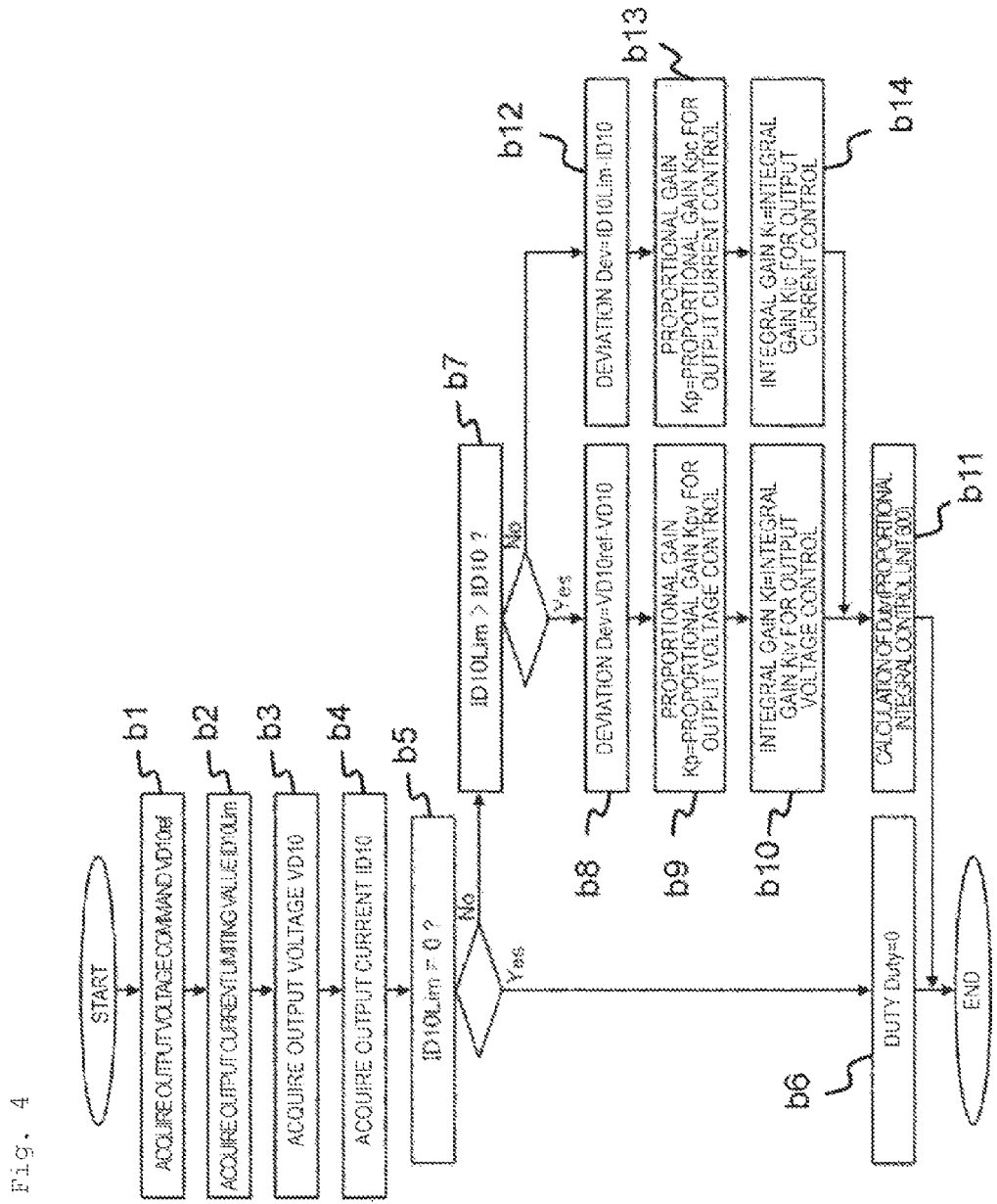
FIG. 4 is a view illustrating a duty generating unit 330 according to the first embodiment.

FIG. 4 is a view illustrating the duty generating unit 330 that is provided to the control device 310 of the DC-DC converter 400 according to the first embodiment of the invention. As illustrated in FIG. 2, the duty generating unit 330 acquires the output voltage command VD10ref and the output current limiting value ID10Lim of the DC-DC converter 400 which are output from the command generating unit 325, and the output voltage VD10 and the output current ID10 of the DC-DC converter 400 which are output from the A/D converter 320. Description will be made with reference to FIG. 4.

The duty generating unit 330 acquires the output voltage command VD10ref in step b1, acquires the output current limiting value ID10Lim in step b2, acquires the output voltage VD10 in step b3, and acquires the output current ID10 in step b4.

Next, in step b5, the duty generating unit 330 determines whether or not the output current limiting value ID10Lim of the DC-DC converter 400 that is acquired in step b2 is 0 (zero).

In a case where it is determined in step b5 that the output current limiting value ID10Lim of the DC-DC converter 400 which is acquired is 0 (zero), in step b6, the duty generating unit 330 sets a duty Duty to 0 (zero). In addition, the duty generating unit 330 inputs the duty Duty, which is set, to the switching signal generating unit 335.

When the duty Duty is calculated as described above, it is possible to turn off all of the MOSFETs 210 to 290 which are switching elements of the DC-DC converter 400.

On the other hand, in a case where it is determined in step b5 that the output current limiting value ID10Lim of the DC-DC converter 400 which is acquired is not 0 (zero), in step b7, the duty generating unit 330 determines whether or not the output current limiting value ID10Lim of the DC-DC converter 400, which is acquired, is greater than the output current ID10 that is acquired.

In a case where it is determined in step b7 that the output current limiting value ID10Lim of the DC-DC converter 400, which is acquired, is greater than the output current ID10, in step b8, the duty generating unit 330 calculates a deviation Dev by subtracting the output voltage VD10 from the output voltage command VD10ref of the DC-DC converter 400 which is acquired. In addition, in step b9, the duty generating unit 330 sets a proportional gain Kpv for output voltage control to a proportional gain Kp that is input to the following proportional integral control unit 600. In addition, in step b10, the duty generating unit 330 sets an integral gain Kiv for output voltage control to an integral gain Ki.

In addition, in step b11, the duty generating unit 330 inputs the deviation Dev that is calculated, and the proportional gain Kp and the integral gain Ki, which are set, to the proportional integral control unit 600, and calculates a duty Duty, which is configured to set the deviation Dev to 0 (zero), by the proportional integral control unit 600. In addition, the duty generating unit 330 inputs the duty Duty, which is calculated, to the switching signal generating unit 335.

When the duty Duty is calculated as described above, it is possible to make the output voltage VD10 of the DC-DC converter 400 match the output voltage command VD10ref.

On the other hand, in a case where it is determined in step b7 that the output current limiting value ID10Lim of the DC-DC converter 400, which is acquired, is equal to or less than the output current ID10, in step b12, the duty generating unit 330 calculates the deviation Dev by subtracting the output current ID10 from the output current limiting value ID10Lim of the DC-DC converter 400 which is acquired. In addition, in step b13, the duty generating unit 330 sets a proportional gain Kpco for output current control to the proportional gain Kp that is input to the proportional integral control unit 600. In addition, in step b14, the duty generating unit 330 sets an integral gain Kico for output current control to the integral gain Ki.

In addition, in step bib, the duty generating unit 330 inputs the deviation Dev that is calculated, and the proportional gain Kp and the integral gain Ki, which are set, to the proportional integral control unit 600, and calculates a duty Duty, which is configured to set the deviation Dev to 0 (zero), by the proportional integral control unit 600. In addition, the duty generating unit 330 inputs the duty Duty, which is calculated, to the switching signal generating unit 335.

When the duty Duty is calculated as described above, it is possible to make the output current ID10 of the DC-DC converter 400 match the output current limiting value ID10Lim.

(Proportional Integral Control Unit 600)

Figure 5:
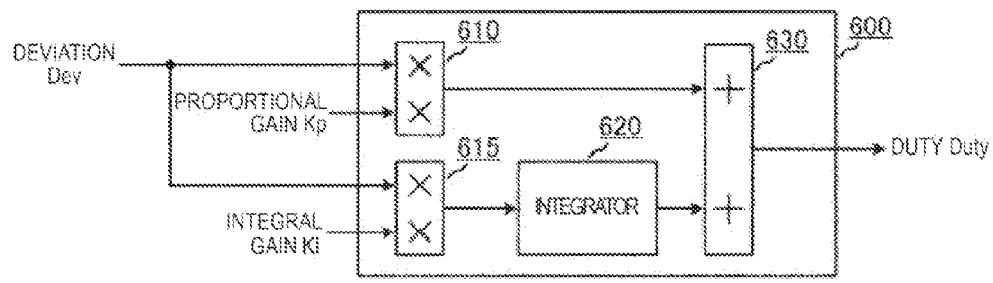
FIG. 5 is a view illustrating a proportional integral control unit 600 according to the first embodiment.

FIG. 5 is a view illustrating the proportional integral control unit 600 that is provided to the duty generating unit 330 of the control device 310 of the DC-DC converter 400 according to the first embodiment of the invention. The proportional integral control unit 600 includes a multiplier 610, a multiplier 615, an integrator 620, and an adder 630.

First, the proportional integral control unit 600 acquires the deviation Dev, the proportional gain Kp, and the integral gain Ki. In addition, the proportional integral control unit 600 inputs the deviation Dev and the proportional gain Kp, which are acquired, to the multiplier 610. In addition, the proportional integral control unit 600 inputs the deviation Dev and the integral gain Ki, which are acquired, to the multiplier 615.

The multiplier 610 multiplies the deviation Dev that is input, and the proportional gain Kp. In addition, the multiplier 610 inputs a multiplication value to the adder 630. The multiplier 615 multiplies the deviation Dev that is input, and the integral gain Ki. In addition, the multiplier 615 inputs a multiplication value to the integrator 620. The integrator 620 integrates the multiplied value that is input from the multiplier 615, and inputs an integration value to the adder 630. The adder 630 adds the multiplied value that is input from the multiplier 610, and the integrated value that is input from the integrator 620 to calculate the duty Duty. The duty Duty, that is calculated, is input to the switching signal generating unit 335.

When the duty Duty is generated as described above, in a case where the output current limiting value ID10Lim of the DC-DC converter 400 is greater than the output current ID10, it is possible to make the output voltage VD10 match the output voltage command VD10ref. In addition, in a case where the output current limiting value ID10Lim of the DC-DC converter 400 is equal to or less than the output current ID10, it is possible to make the output current ID10 match the output current limiting value ID10Lim.

Next, description will be given of an advantage of the invention over a typical method of controlling both of the output voltage and the output current of the DC-DC converter. First, description will be given of a typical method of controlling both of the output voltage and the output current of the DC-DC converter. Examples of the typical method of controlling both of the output voltage and the output current include a method in which a proportional integral control unit for output voltage control, and a proportional integral control unit for output current control are independently prepared, and the proportional integral control unit for the output current control is incorporated in an inner loop of the proportion integral control unit of the output voltage control.

However, in the typical method, the output voltage control and the output current control interfere each other. Accordingly, it is necessary to set responsiveness of the output voltage control to be sufficiently slower than that of the output current control so as to stabilize the output voltage control that is incorporated in the inner loop. That is, in the above-described typical method, the responsiveness of the output voltage control is slower, and thus in a case where disturbance such as a rapid variation in the load current occurs, the output voltage rapidly varies.

On the other hand, in the invention, as described above, since the proportional integral control unit, which is common to the output voltage control and the output current control, is prepared, and the deviation, the proportional gain, and the integral gain are converted for the output voltage control and for output current control in accordance with a result of comparison between the output current limiting value and the output current of the DC-DC converter 400, the output voltage control and the output current control do not interfere each other. That is, in the invention, the responsiveness of the output voltage control may be set to a high speed, and thus even in a case where disturbance such as a rapid variation in the load current occurs, it is possible to obtain a stable output voltage without a rapid variation of the output voltage.

(Switching Signal Generating Unit 335)

Next, description will be given of the switching signal generating unit 335 that is provided to the control device 310 of the DC-DC converter 400 according to the first embodiment of the invention. As described in FIG. 2, the switching signal generating unit 335 generates ON/OFF signals S30 to S100 of the MOSFETs 210 to 280 of the DC-DC converter 400 on the basis of the duty Duty that is input from the duty generating unit 330. Examples of a method of generating the ON/OFF signals S30 to S60 include a phase shift PWM.

Figure 6:
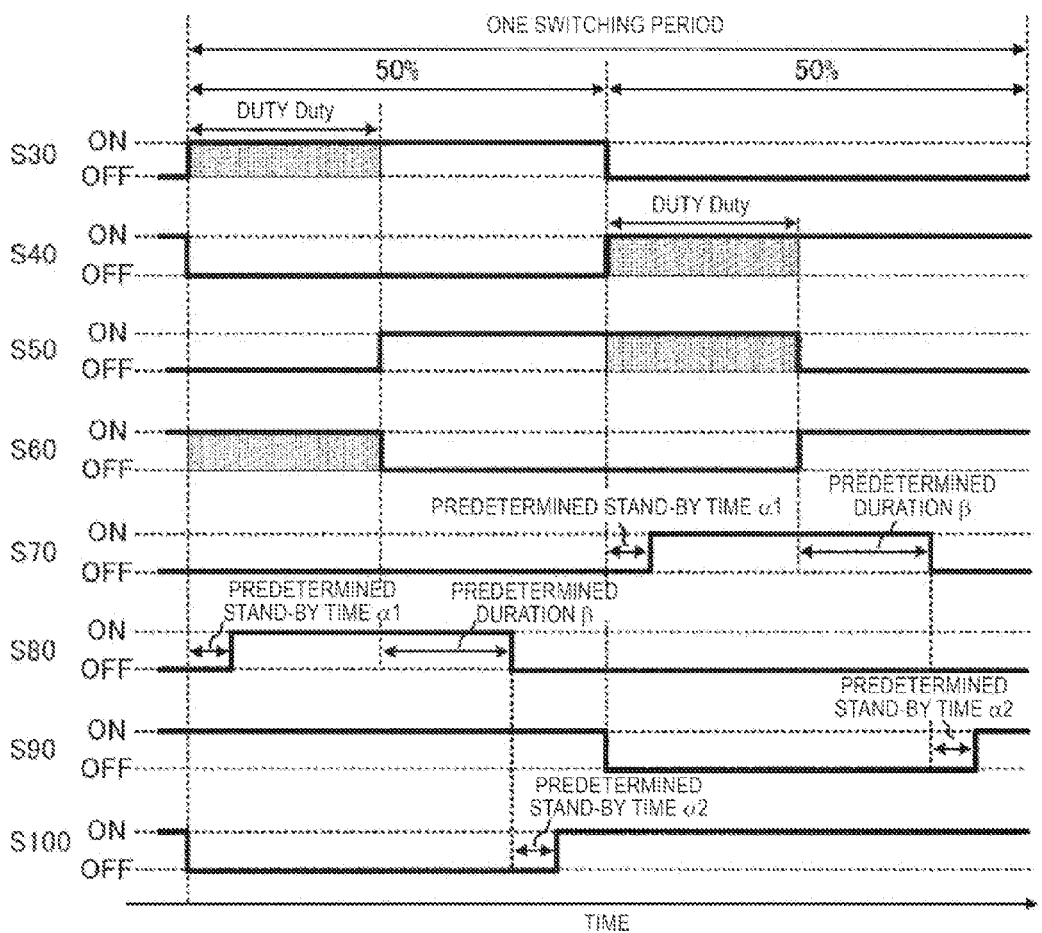
FIG. 6 is a view illustrating a switching signal generating unit 335 according to the first embodiment.

FIG. 6 is a view illustrating the switching signal generating unit 335 which is provided to the control device 310 of the DC-DC converter 400 according to the first embodiment of the invention and to which the phase shift PWM is applied. The switching signal generating unit 335 fixes a ratio between ON time and OFF time of the ON/OFF signals S30 to S60 to 50%, and changes a phase difference of the ON/OFF signals S30 to S60. In addition, the switching signal generating unit 335 adjusts a period in which the ON of ON/OFF signal S30 of the MOSFET 210 and ON of the ON/OFF signal S60 of the MOSFET 240 overlap each other, and a period in which the ON of the ON/OFF signal S40 of the MOSFET 220 and ON of the ON/OFF signal S50 of the MOSFET 230 overlap each other to be equal to the duty Duty that is generated by the duty generating unit 330. According to this, the DC-DC converter 400 can make the output voltage or the output current match each command value.

Here, as an example, description will be given of a method of generating the ON/OFF signals S30 to S100 of the MOSFETs 210 to 280 of the DC-DC converter 400 in a state in which the ON/OFF signal S30 of the MOSFET 210 of the primary side circuit of the DC-DC converter 400 is set as a reference.

First, the switching signal generating unit 335 generates the ON/OFF signal S30 of the MOSFET 210 of the primary side circuit of the DC-DC converter 400. The ON/OFF signal S30 is generated as a pulse signal in which a ratio of ON time and OFF time is fixed to 50%. For example, in a case where a switching frequency is set to Fsw [Hz], the ON time and the OFF time of the ON/OFF signal S30 can be expressed by Expression (2). That is, the ON time and the OFF time of the ON/OFF signal S30 become 50% of one switching period.

(Expression 2)

$$\text{On time of } S30 = \text{OFF time of } S30 = 0.5/Fsw \qquad (2)$$

Next, the switching signal generating unit 335 generates the ON/OFF signal S40 of the MOSFET 220. The ON/OFF signal S40 is generated so that the ON/OFF signal S40 becomes OFF in a period in which the ON/OFF signal S30 becomes ON, and becomes ON in a period in which the ON/OFF signal S30 becomes OFF.

Next, the switching signal generating unit 335 generates the ON/OFF signal S50 of the MOSFET 230. The ON/OFF signal S50 is generated so that the ON/OFF signal S50 becomes ON with a delay by a duty Duty generated by the duty generating unit 330 after the ON/OFF signal S30 becomes ON, and becomes OFF after the passage of time corresponding to 50% of the one switching period.

Next, the switching signal generating unit 335 generates the ON/OFF signal S60 of the MOSFET 240. The ON/OFF signal S60 is generated so that the ON/OFF signal S60 becomes ON with a delay by the duty Duty generated by the duty generating unit 330 after the ON/OFF signal S40 becomes ON, and becomes OFF after the passage of time corresponding to 50% of the one switching period.

When the ON/OFF signals S30 to S60 are generated as described, it is possible to adjust a period in which ON of the ON/OFF signal S30 and ON of the ON/OFF signal S60 overlap each other, and a period in which ON of the ON/OFF signal S40 and ON of the ON/OFF signal S50 overlap each other to be equal to the duty Duty that is generated by the duty generating unit 330.

Next, the switching signal generating unit 335 generates ON/OFF signal S70 of the MOSFET 250 of the secondary side circuit of the DC-DC converter 400. The ON/OFF signal S70 becomes ON with a delay by a predetermined stand-by time α1 after the ON/OFF signal S30 becomes OFF. In addition, the ON/OFF signal S70 is generated so that the ON/OFF signal S70 becomes OFF after the passage of time, which is obtained by adding the duty Duty generated by the duty generating unit 330 and a predetermined duration β, after the ON/OFF signal S30 becomes OFF.

Next, the switching signal generating unit 335 generates the ON/OFF signal S80 of the MOSFET 260. The ON/OFF signal S80 becomes ON with a delay by a predetermined stand-by time α1 after the ON/OFF signal S40 becomes OFF. In addition, the ON/OFF signal S80 is generated so that the ON/OFF signal S80 becomes OFF after the passage of time, which is obtained by adding the duty Duty and the predetermined duration β, after the ON/OFF signal S40 becomes OFF.

When the ON/OFF signal S70 and the ON/OFF signal S80 are generated as described above, it is possible to reduce a circulating current that occurs in a period in which ON of the ON/OFF signal S30 and ON of the ON/OFF signal S50 overlap each other, and in a period in which ON of the ON/OFF signal S40 and ON of the ON/OFF signal S60 overlap each other. In addition, it is possible to provide surge energy, which is accumulated in the snubbing capacitor 25 of the secondary side circuit of the DC-DC converter 400, to the load 110. According to this, it is possible to attain high efficiency of the DC-DC converter 400.

Next, the switching signal generating unit 335 generates the ON/OFF signal S90 of the MOSFET 270. The ON/OFF signal S90 becomes ON with a delay by a predetermined stand-by time α2 after the ON/OFF signal S70 becomes OFF. In addition, the ON/OFF signal S90 is generated to become OFF simultaneously with OFF of the ON/OFF signal S30.

Next, the switching signal generating unit 335 generates the ON/OFF signal S100 of the MOSFET 280. The ON/OFF signal S100 becomes ON with a delay by the predetermined stand-by time α2 after the ON/OFF signal S80 becomes OFF. In addition, the ON/OFF signal S100 is generated to become OFF simultaneously with OFF of the ON/OFF signal S40.

When the ON/OFF signal S90 and the ON/OFF signal S100 are generated as described above, it is possible to reduce a current flowing through a parasitic diode of the MOSFET 270 and the MOSFET 280. That is, synchronous rectification is possible, and thus it is possible to attain high efficiency of the DC-DC converter 400.

However, so as to realize zero-voltage switching in addition to prevention of short-circuit of MOSFETs of upper and lower arms in respective phases of the DC-DC converter 400, it is preferable that dead time is provided to the ON/OFF signals S30 to S60 of the MOSFETs 210 to 240 of the DC-DC converter 400. In addition, in a case where the duty Duty input to the switching signal generating unit 335 is 0 (zero), the switching signal generating unit 335 generates the ON/OFF signals S30 to S100 of the MOSFETs 210 to 280 of the DC-DC converter 400 so that all of the ON/OFF signals become OFF.

(Gate Drive Circuit 340)

The gate drive circuit 340, which is provided to the control device 310 of the DC-DC converter 400, converts the ON/OFF signals S30 to S100, which are input from the switching signal generating unit 335, to gate voltages V30 to V100. In addition, the gate drive circuit 340 inputs the gate voltages V30 to V100, which are converted, to the gates of the MOSFETs 210 to 280 of the DC-DC converter 400. According to this, the MOSFETs 210 to 240 of the DC-DC converter 400 are turned ON/OFF in accordance with the gate voltages V30 to V100.

(Relationship Between Input Voltage, Output Voltage, and Output Current)

Next, description will be given of a relationship between the input voltage V5, the output voltage V10, and the output current I10 of the DC-DC converter 400, which is obtained through application of the first embodiment of the invention, with reference to an example in FIG. 7 and FIG. 8.

(When Input Voltage Transitions from Second Region to First Region)

Figure 7:
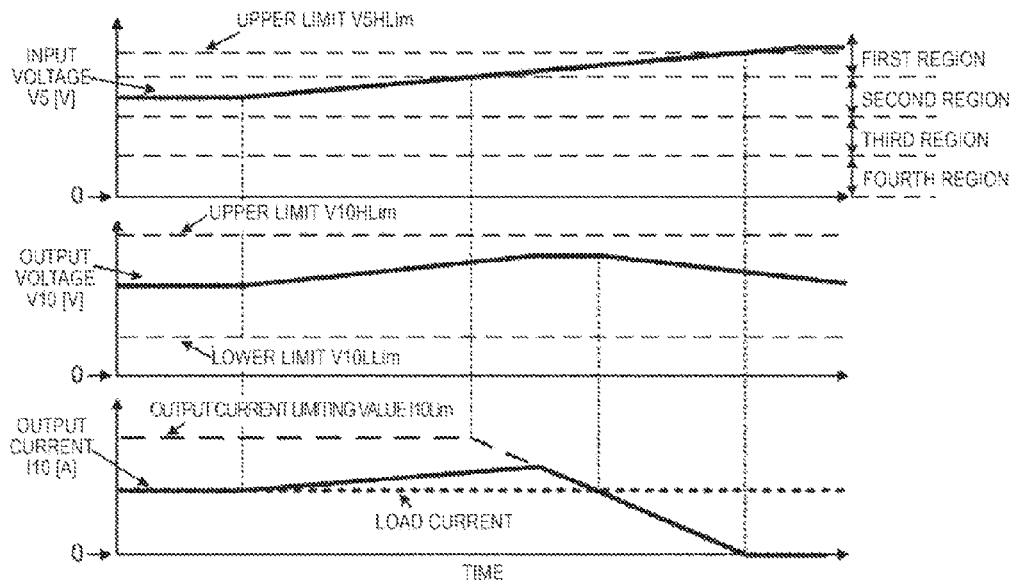
FIG. 7 is a view illustrating a relationship between an input voltage V5, an output voltage V10, and an output current I10 according to the first embodiment.

FIG. 7 is a view illustrating a relationship between the input voltage V5, the output voltage V10, and the output current I10 when the input voltage V5 transitions from the second region to the first region under conditions in which the output voltage V10 of the DC-DC converter 400 according to the first embodiment of the invention is greater than a lower limit V10LLim, and the load current is constant.

However, in FIG. 7, an upper limit V5HLim is a value that expresses a digital value of the upper limit VD5HLim as an analog value. An upper limit V10HLim is a value that expresses a digital value of the upper limit VD10HLim as an analog value. The lower limit V10LLim is a value that expresses a digital value of the lower limit VD10LLim as an analog value. An output current limiting value I10Lim is a value that expresses a digital value of the output current limiting value ID10Lim as an analog value.

In FIG. 7, at first, the input voltage V5 pertains to the second region. At this time, in step a10 of FIG. 3, the command generating unit 325 sets the output voltage command VD10ref to a predetermined output voltage value corresponding to the input voltage VD5. As described above, the output voltage command VD10ref linearly rises with respect to the rising of the input voltage VD5. In addition, in step a11, the command generating unit 325 sets the output current limiting value ID10Lim to the upper limit ID10HLim.

In addition, the output current limiting value I10Lim is greater than the output current I10. At this time, in step b8 of FIG. 4, the duty generating unit 330 calculates a deviation Dev that is a difference between an output voltage command value VD10 and the output voltage VD10. In addition, in step b11, the duty generating unit 330 calculates the duty Duty so as to set the deviation Dev to 0 (zero). In a region (a), the output current limiting value I10Lim is greater than the output current I10, and it enters a mode of controlling the output voltage V10.

The switching signal generating unit 335 generates an ON/OFF signal of a MOSFET on the basis of the duty Duty so that an output voltage command and an output voltage match each other. Therefore, the output voltage V10 rises in combination with the rising of the input voltage V5.

In addition, when the input voltage V5 rises and reaches the first region, in step a8 of FIG. 3, the command generating unit 325 sets the output current limiting value I10Lim to a predetermined output current value that linearly decreases with respect to the rising of the input voltage VD5. That is, the output current limiting value I10Lim decreases in combination with the rising of the input voltage V5. In addition, in a duration in which the output current limiting value I10Lim is greater than the output current I10, as described above, it enters the mode of controlling the output voltage V10 of the DC-DC converter 400, and thus the output voltage V10 rises continuously in combination with the rising of the input voltage V5.

In addition, when the output current limiting value I10Lim decreases and becomes equal to or less than the output current I10, the duty generating unit 330 is switched to a mode of controlling the output current I10 as illustrated in step b12 to step b14 of FIG. 4. When the duty generating unit 330 is switched from the mode of controlling the output voltage V10 to the mode of controlling the output current I10, a MOSFET is controlled so that the output current I10 is equal to the output current limiting value I10Lim. The output current limiting value I10Lim decreases in combination with the rising of the input voltage VD5, and as a result, the output current I10 lowers.

In addition, when the output current I10 becomes less than the load current, a current is supplied from the low-voltage side battery 100 to the load 110. Accordingly, the output voltage V10 lowers in combination with the lowering of the output current I10.

In addition, when the input voltage V5 reaches an upper limit V5Lim, in step a6 of FIG. 3, the command generating unit 325 sets the output current limiting value I10Lim to 0 (zero). The duty generating unit 330 acquires the output current limiting value I10Lim, and sets the duty Duty to 0 (zero) in step b6 of FIG. 4. Accordingly, all of the MOSFETs 210 to 280 of the DC-DC converter 400 are turned off, and thus the output current I10 becomes 0 (zero).

(When Input Voltage Transitions from Third Region to Fourth Region)

Figure 8:
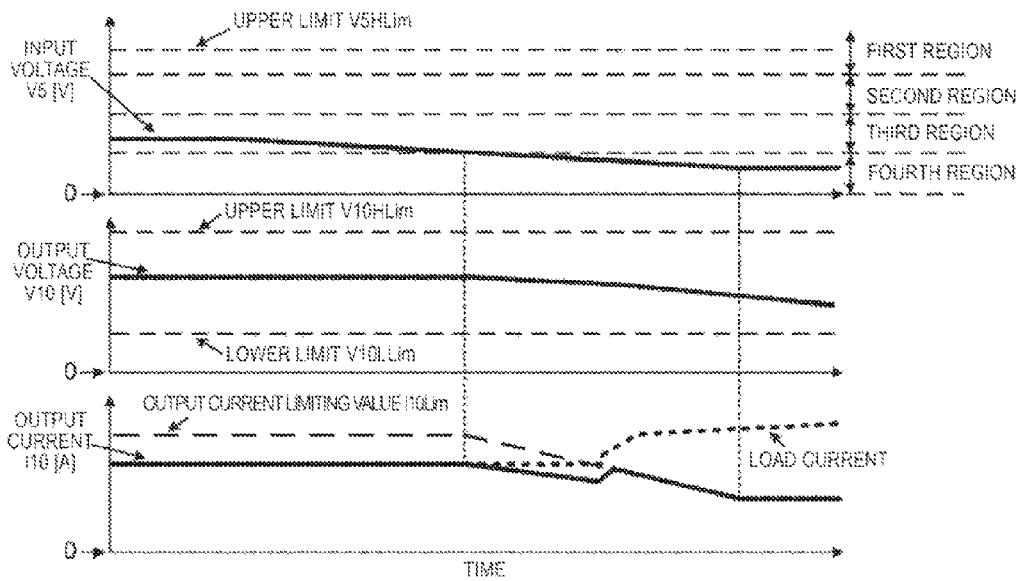
FIG. 8 is a view illustrating a relationship between the input voltage V5, the output voltage V10, and the output current I10 according to the first embodiment.

FIG. 8 is a view illustrating a relationship between the input voltage V5, the output voltage V10, and the output current I10 when the input voltage V5 transitions from the third region to the fourth region under conditions in which the output voltage V10 of the DC-DC converter 400 according to the first embodiment of the invention is greater than the lower limit V10LLim, and the load current rises.

In FIG. 8, at first, the input voltage V5 pertains to the third region. At this time, in step a13 of FIG. 3, the command generating unit 325 sets the output voltage command VD10ref to a reference voltage value VD10st. As described above, the output voltage command VD10ref is set to a constant value. In addition, in step a11, the command generating unit 325 sets the output current limiting value ID10Lim to the upper limit ID10HLim.

At this time, since the output current limiting value I10Lim is greater than the output current I10, the duty generating unit 330 enters the mode of controlling the output voltage V10. The output voltage command VD10ref is set to the reference voltage value VD10st, and thus the output voltage V10 is controlled to a constant value. In addition, the load current is constant, and thus the output current I10 is also controlled to a constant value.

In addition, when the input voltage V5 lowers and reaches the fourth region, in step a17 of FIG. 3, the command generating unit 325 sets the output voltage command VD10ref to a predetermined output voltage value that linearly lowers with respect to the lowering of the input voltage VD5. In addition, in step a18, the command generating unit 325 sets the output current limiting value I10Lim to a predetermined current value that linearly lowers with respect to the lowering of the input voltage VD5.

Here, since the output current limiting value I10Lim is greater than the output current I10, the duty generating unit 330 enters the mode of controlling the output voltage V10. Accordingly, the output voltage V10 lowers on the basis of the output voltage command VD10ref.

On the other hand, in a case where the output current limiting value I10Lim is equal to or less than the output current I10, as described above, since the duty generating unit 330 enters the mode of controlling the output current I10, even in a case where the load current rises, it is possible to lower the output current I10 in combination with the rising of the input voltage V5.

In the related art, only the output voltage is controlled, and thus the output current rises in combination with the rising of the load current. In the invention, since the output current is limited in accordance with the magnitude of the input voltage of the DC-DC converter, it is possible to lower the output current in combination with the lowering of the input voltage regardless of a variation in the load current.

In addition, when the output current I10 becomes less than the load current, a current is supplied from the low-voltage side battery 100 to the load 110. Accordingly, the output voltage V10 lowers in combination with the lowering of the output current I10.

In addition, the method of limiting the output current of the DC-DC converter is not limited to the circuit configuration of the DC-DC converter 400 which is illustrated in FIG. 1, and other circuit configuration may be applied.

Second Embodiment
(Hybrid Vehicle System Including DC-DC Converter)

Figure 9:
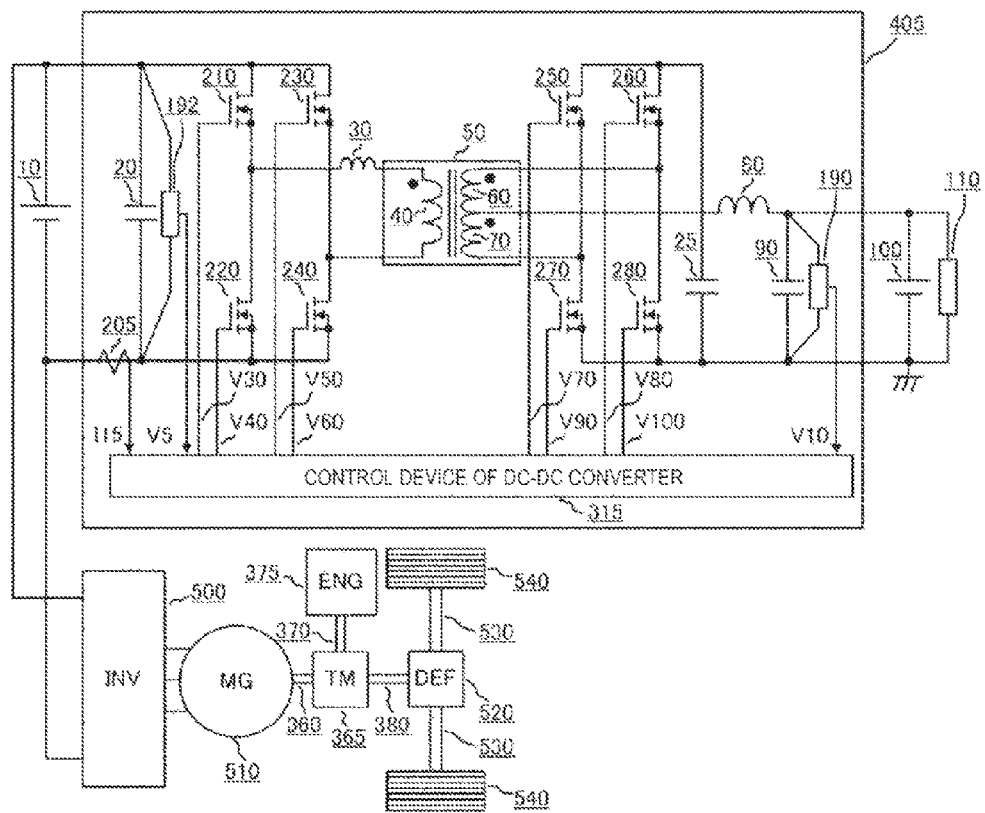
FIG. 9 is a view illustrating a hybrid vehicle system including a DC-DC converter 405 according to a second embodiment.

FIG. 9 is a view illustrating a hybrid vehicle system including a DC-DC converter 405 according to a second embodiment of the invention. In the DC-DC converter 400 according to the first embodiment of the invention, the input voltage V5, the output voltage V10, and the output current I10 of the DC-DC converter 400 are detected, and the output voltage V10 and the output current I10 of the DC-DC converter 400 are controlled to a predetermined value in accordance with the magnitude of the input voltage V5 that is detected. In this embodiment, an input voltage V5, an output voltage V10, and an input current I15 of a DC-DC converter 405 are detected, and the output voltage V10 and the input current I15 of the DC-DC converter 405 are controlled to a predetermined value in accordance with the magnitude of input voltage V5 that is detected. The configuration of the hybrid vehicle system except for the DC-DC converter 405 is the same as in the first embodiment of the invention, and thus description thereof will be omitted.

The DC-DC converter 405 according to the second embodiment of the invention includes a filter capacitor 20, a voltage sensor 192, a current sensor 205, MOSFETs 210, 220, 230, and 240, and a resonant inductor 30 in a primary side circuit. In the filter capacitor 20, one end of the filter capacitor 20 is connected to a high-potential side of the high-voltage battery 10, and the other end of the filter capacitor 20 is connected to one end of the current sensor 205. The other end of the current sensor 205 is connected to a low-potential side of the high-voltage battery 10. In the voltage sensor 192, one end of the voltage sensor 192 is connected to the high-potential side of the high-voltage battery 10, and the other end of the voltage sensor 192 is connected to the one end of the current sensor 205.

The high-potential side of the high-voltage battery 10 is connected to a drain of the MOSFET 210 and a drain of the MOSFET 230. One end of the current sensor 205 is connected to a source of the MOSFET 220 and a source of the MOSFET 240. A source of the MOSFET 210 is connected to a drain of the MOSFET 220 and one end of the resonance inductor 30. The other end of the resonant inductor 30 is connected to one end of a primary side winding 40 of a transformer 50. The other end of the primary side winding 40 of the transformer 50 is connected to a source of the MOSFET 230 and a drain of the MOSFET 240.

The DC-DC converter 405 includes a smoothing capacitor 90, a smoothing inductor 80, a snubbing capacitor 25, a voltage sensor 190, and MOSFETs 250, 260, 270, and 280 in a secondary side circuit.

One end of a secondary side winding 60 of the transformer 50 is connected to a source of the MOSFET 260, and a drain of the MOSFET 280. The other end of the secondary side winding 60 of the transformer 50 is connected to one end of a secondary side winding 70 of the transformer 50, and one end of the smoothing inductor 80. The other end of the secondary side winding 70 of the transformer 50 is connected to a source of the MOSFET 250, and a drain of the MOSFET 270.

A drain of the MOSFET 250 and a drain of the MOSFET 260 are connected to the snubbing capacitor 25. The other end of the snubbing capacitor 25 is connected to a source of the MOSFET 270 and a source of the MOSFET 280.

The other end of the smoothing inductor 80 is connected to one end of the smoothing capacitor 90, and one end of the voltage sensor 190. The other end of the smoothing capacitor 90 and the other end of the voltage sensor 190 are connected to the other end of the snubbing capacitor 25.

A high-potential side of the low-voltage battery 100 is connected to one end of the smoothing capacitor 90, the one end of the voltage sensor 190, and the other end of the smoothing inductor 80. A low-potential side of the low-voltage battery 100 is connected to the other end of the smoothing capacitor 90, the other end of the voltage sensor 190, and a chassis ground of a vehicle. In addition, one end of the load 110 is connected to the high-potential side of the low-voltage battery 100, and the other end of the load 110 is connected to the low-potential side of the low-voltage battery 100.

The DC-DC converter 405 includes the voltage sensor 192 that is connected to the high-voltage side battery 10 in parallel, the voltage sensor 190 that is connected to the low-voltage side battery 100 in parallel, and the current sensor 205 that is connected to the high-voltage side battery 10 in series. The voltage sensor 192 detects an input voltage V5 of the DC-DC converter 400. The voltage sensor 190 detects an output voltage V10 of the DC-DC converter 400. The current sensor 205 detects an input current I15 of the DC-DC converter 400.

A control device 315 of the DC-DC converter 405 generates a gate voltage V30 configured to control ON/OFF of the MOSFET 210 that is a switching element of the DC-DC converter 405 on the basis of the input voltage V5, the output voltage V10, and the input current I15, and inputs the gate voltage V30 that is generated to a gate of the MOSFET 210. As described below, the control device 310 of the DC-DC converter 400 inputs a gate voltage V40 to a gate of the MOSFET 220, inputs a gate voltage V50 to a gate of the MOSFET 230, inputs a gate voltage V60 to a gate of the MOSFET 240, inputs a gate voltage V70 to a gate of the MOSFET 250, inputs a gate voltage V80 to a gate of the MOSFET 260, inputs a gate voltage V90 to a gate of the MOSFET 270, and inputs a gate voltage V100 to a gate of the MOSFET 280.

(Control Device 315 of DC-DC Converter)

Figure 10:
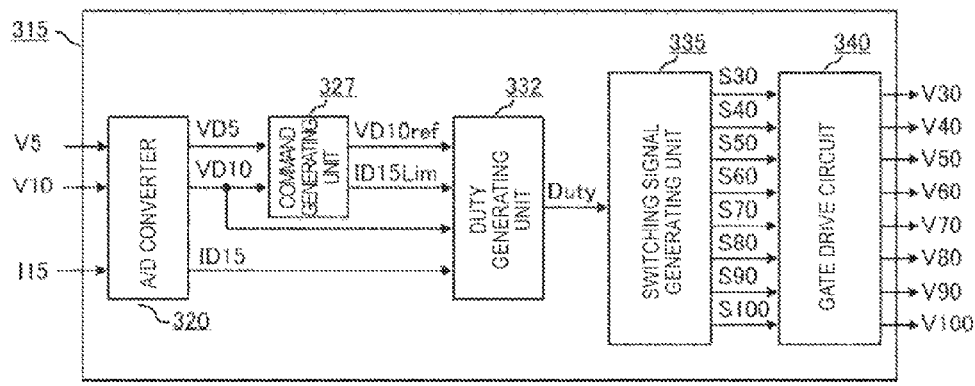
FIG. 10 is a view illustrating a control device 315 according to the second embodiment.

FIG. 10 is a view illustrating a control device 315 of the DC-DC converter 405 according to the second embodiment of the invention. The control device 315 of the DC-DC converter 405 includes an A/D converter 320 that converts an analog value to a digital value, a command generating unit 327, a duty generating unit 332, a switching signal generating unit 335, and a gate drive circuit 340.

The A/D converter 320 converts an analog value of the input voltage V5 of the DC-DC converter 405, which is detected by the voltage sensor 192, into a digital value VD5. In addition, the A/D converter 320 converts an analog value of the output voltage V10 of the DC-DC converter 405, which is detected by the voltage sensor 190, into a digital value VD10. In addition, the A/D converter 320 converts an analog value of the input current I15 of the DC-DC converter 405, which is detected by the current sensor 205, into a digital value ID15.

The command generating unit 327 generates an output voltage command VD10ref and an input current limiting value ID15Lim of the DC-DC converter 405 on the basis of the digital value VD5 (hereinafter, referred to as an input voltage VD5 of the DC-DC converter 405) that represents the input voltage V5 of the DC-DC converter 405 which is detected by the voltage sensor 192, and the digital value VD10 (hereinafter, referred to as an output voltage VD10 of the DC-DC converter 405) that represents the output voltage V10 of the DC-DC converter 405 which is detected by the voltage sensor 190.

The duty generating unit 332 generates a duty Duty of each of the MOSFETs 210, 220, 230, and 240 on the basis of the output voltage command VD10ref and the input current limiting value ID15Lim of the DC-DC converter 405 which are generated by the command generating unit 327, the output voltage VD10 of the DC-DC converter 405 which is output from the A/D converter 320, and the digital value ID15 (hereinafter, referred to as an input current ID15 of the DC-DC converter 405) that represents the input current I15.

The switching signal generating unit 335 generates ON/OFF signals S30, S40, S50, S60, S70, S80, S90, and S100 of the MOSFETs 210, 220, 230, 240, 250, 260, 270, and 280 of the DC-DC converter 405 on the basis of the duties Duty of the MOSFETs 210, 220, 230, and 240 of the DC-DC converter 405 which are generated by the duty generating unit 332.

The gate drive circuit 340 generates the gate voltages V30 to V100 which are configured to turn on and turn off the MOSFETs 210 to 280 of the DC-DC converter 405 on the basis of the ON/OFF signals S30 to S100 of the MOSFETs 210 to 280 of the DC-DC converter 405 which are generated by the switching signal generating unit 335.

(Command Generating Unit 327)

Figure 11:
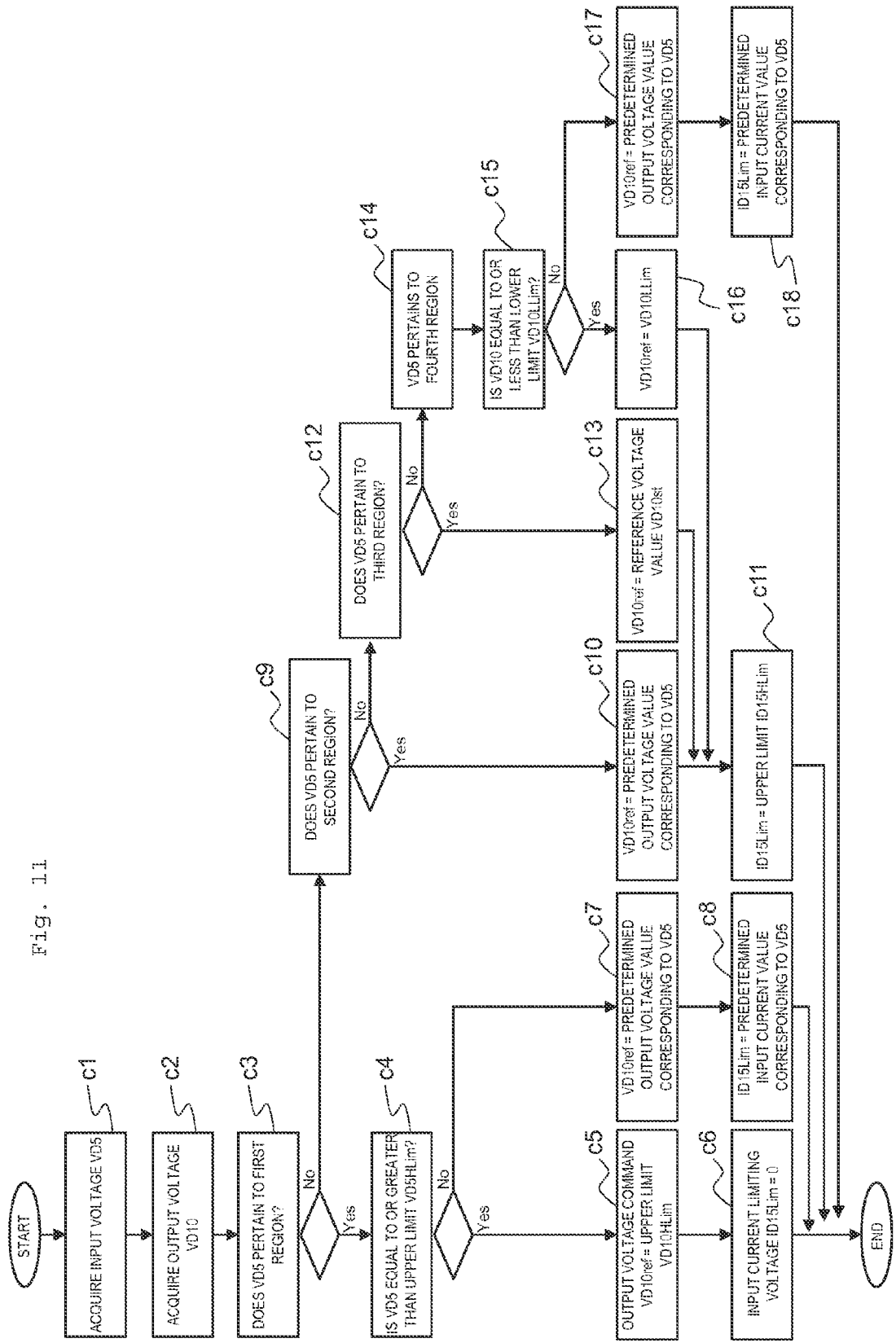
FIG. 11 is a view illustrating a command generating unit 327 according to the second embodiment.

FIG. 11 is a view illustrating the command generating unit 327 that is provided to the control device 315 of the DC-DC converter 405 according to the second embodiment of the invention. However, a method of generating the output voltage command VD10ref by the command generating unit 327 that is provided to the control device 315 of the DC-DC converter 405 according to the second embodiment of the invention is the same as in the first embodiment, and thus description thereof will not be repeated. As is the case with the first embodiment of the invention, with regard to the input voltage VD5 of the DC-DC converter 405, the command generating unit 327 determines four regions in advance similar to Expression (1).

First, in step c1 illustrated in FIG. 11, the command generating unit 327 acquires the input voltage VD5 of the DC-DC converter 405 which is output from the A/D converter 320 (hereinafter, simply referred to as an input voltage VD5), and in step c2, acquires the output voltage VD10 of the DC-DC converter 405 (hereinafter, simply referred to as an output voltage VD10). Next, in step c3, command generating unit 327 determines whether or not the input voltage VD5, which is acquired in step c1, pertains to the first region.

(In Case Where Input Voltage Pertains to First Region)

In a case where it is determined in step c3 that the input voltage VD5 pertains to the first region, in step c4, the command generating unit 327 determines whether or not the input voltage VD5 is equal to or greater than the upper limit VD5HLim.

In a case where it is determined in step c4 that the input voltage VD5 is equal to or greater than the upper limit VD5HLim, in step c5, the command generating unit 327 sets the output voltage command VD10ref of the DC-DC converter 405 by the same method as in the first embodiment of the invention. In addition, in step c6, the command generating unit 327 sets the input current limiting value ID15Lim to 0 (zero).

In addition, the command generating unit 327 inputs the output voltage command VD10ref that is set in step c5, and the input current limiting value ID15Lim that is set in step c6 to the duty command generating unit 332.

When the input current limiting value ID15Lim of the DC-DC converter 405 is set as described above, it is possible to turn off all of the MOSFETs 210 to 240 of the primary side circuit of the DC-DC converter 405 before the total voltage of the input voltage V5 and a surge voltage that occurs due to switching of the MOSFETs 210 to 240 exceeds a withstand voltage of the MOSFETs 210 to 240. In addition, it is possible to turn off all of the MOSFETs 250 to 280 before the total voltage of a voltage that is supplied to the secondary side circuit through the transformer 50, and a surge voltage that occurs due to switching of the MOSFETs 250 to 280 exceeds a withstand voltage of the MOSFETs 250 to 280. According to this, it is possible to prevent over-voltage breakdown of the MOSFETs 210 to 280.

On the other hand, in a case where it is determined in step c4 that the input voltage VD5 is less than the upper limit VD5HLim, in step c7, the command generating unit 327 sets the output voltage command VD10ref of the DC-DC converter 405 by the same method as in the first embodiment of the invention. In addition, in step c8, the command generating unit 327 sets the input current limiting value ID15Lim to a predetermined input current value corresponding to the input voltage VD5 that is acquired in step c1.

In addition, the command generating unit 327 inputs the output voltage command VD10ref that is set in step c7, and the input current limiting value ID15Lim that is set in step c8 to the duty command generating unit 332.

When the output voltage command VD10ref of the DC-DC converter 405 is set in the same manner as in the first embodiment of the invention, even in a case where the input voltage V5 of the DC-DC converter 405 varies, it is possible to suppress a rapid variation in the output voltage V10 of the DC-DC converter 405.

In addition, the predetermined input current value that is set as the input current limiting value ID15Lim of the DC-DC converter 405 is linearly lowered with respect to a rising of the input voltage VD5 of the DC-DC converter 405 which is acquired, and is linearly raised with respect to a lowering of the input voltage VD5 of the DC-DC converter 405 which is acquired. In addition, the predetermined input current value is linearly changed from 0 (zero) to the upper limit ID15HLim that is determined in advance with respect to the input current ID15 of the DC-DC converter 405 (hereinafter, simply referred to as an input current ID15) in accordance with a variation in the acquired input voltage VD5 of the DC-DC converter 405.

When input current limiting value ID15Lim of the DC-DC converter 405 is set as described above, even in a case where the input voltage V5 varies, it is possible to suppress a rapid variation in the input current I15. According to this, a derating operation of limiting the input current I15 can be stabilized, and thus reliability of the DC-DC converter 405 is improved.

(Case Where Input Voltage Pertains to Second Region)

On the other hand, in a case where it is determined in step c3 that the input voltage VD5 does not pertain to the first region, in step c9, the command generating unit 327 determines whether or not the input voltage VD5 pertains to the second region.

In a case where it is determined in step c9 that the input voltage VD5 pertains to the second region, that is, in a case where the high-voltage side battery 10 is very likely to enter an over-charged state, in step c10, the command generating unit 327 sets the output voltage command VD10ref of the DC-DC converter 405 by the same method as in the first embodiment of the invention. In addition, in step c11, the command generating unit 327 sets the input current limiting value ID15Lim to the upper limit ID15HLim.

In addition, the command generating unit 327 inputs the output voltage command VD10ref that is set in step c10, and the input current limiting value ID15Lim that is set in step c11 to the duty command generating unit 332.

When the output voltage command VD10ref of the DC-DC converter 405 is set in the same manner as in the first embodiment of the invention, even in a case where the input voltage V5 of the DC-DC converter 405 varies, it is possible to suppress a rapid variation in the output voltage V10 of the DC-DC converter 405. In addition, since the input current limiting value ID15Lim is set to the upper limit ID15HLim, it is possible to raise the input current I15 of the DC-DC converter 405 in combination with the rising of the input voltage V5 of the DC-DC converter 405. That is, it is possible to increase electric power that is taken out from the high-voltage side battery 10 in combination with the rising of the input voltage V5 of the DC-DC converter 405, and thus it is possible to suppress the rising of the voltage of the high-voltage side battery 10. According to this, it is possible to suppress over-charging of the high-voltage side battery 10.

(In Case Where Input Voltage Pertains to Third Region)

On the other hand, in a case where it is determined in step c9 that the input voltage VD5 does not pertain to the second region, in step c12, the command generating unit 327 determines whether or not the input voltage VD5 pertains to the third region.

In a case where it is determined in step c12 that the input voltage VD5 pertains to the third region, that is, the high-voltage side battery 10 is less likely to enter an over-discharged or over-charged state, in step c13, the command generating unit 327 sets the output voltage command VD10ref of the DC-DC converter 405 by the same method as in the first embodiment of the invention. In addition, in step c11, the command generating unit 327 sets the input current limiting value ID15Lim to the upper limit ID15HLim.

In addition, in step c13, the command generating unit 327 inputs the output voltage command VD10ref that is set in step c13, and the input current limiting value ID15Lim that is set in step c11 to the duty command generating unit 332.

When the output voltage command VD10ref and the input current limiting value ID15Lim of the DC-DC converter 405 are set as described above, even in a case where the input voltage VD5 transitions from the third region to the second region, or even in a case where the input voltage VD5 transitions from the third region to the fourth region, it is possible to suppress a rapid variation in the output voltage V10. In addition, it is possible to prevent the high-voltage side battery 10 and the low-voltage side battery 100 from being over-discharged or over-charged.

(In Case Where Input Voltage Pertains to Fourth Region)

On the other hand, in a case where it is determined in step c12 that the input voltage VD5 does not pertain to the third region, in step c14, the command generating unit 327 determines that the input voltage VD5 pertains to the fourth region. That is, the command generating unit 327 determines that the high-voltage side battery 10 is very likely to reach an over-discharged state.

Next, in step c15, the command generating unit 327 determines whether or not the output voltage VD10 is equal to or less than the lower limit VD10LLim.

In a case where it is determined in step c15 that the output voltage VD10 is equal to or less than the lower limit VD10LLim, in step c16, the command generating unit 327 sets the output voltage command VD10ref of the DC-DC converter 405 by the same method as in the first embodiment of the invention. In addition, in step c11, the command generating unit 327 sets the input current limiting value ID15Lim to the upper limit ID15HLim.

In addition, the command generating unit 327 inputs the output voltage command VD10ref that is set in step c16, and the input current limiting value ID15Lim that is set in step c11 to the duty command generating unit 332.

When the output voltage command VD10ref and the input current limiting value ID15Lim of the DC-DC converter 405 are set as described above, it is possible to prevent the low-voltage side battery 100 from being over-discharged. In a state of the input voltage V5 and the output voltage V10, it is preferable that the DC-DC converter 405 is controlled as described above to give priority to prevention of over-discharging of the low-voltage side battery 100, thereby avoiding the over-discharging of the high-voltage side battery 10 by the regeneration operation.

On the other hand, in a case where it is determined in step c15 that the output voltage VD10 is greater than the lower limit VD10LLim, in step c17, the command generating unit 327 sets the output voltage command VD10ref of the DC-DC converter 405 by the same method as in the first embodiment of the invention. In addition, in step c18, the command generating unit 327 sets the input current limiting value ID15Lim to a predetermined input current value corresponding to the input voltage VD5 of the DC-DC converter 405.

In addition, the command generating unit 327 inputs the output voltage command VD10ref that is set in step c17, and the input current limiting value ID15Lim that is set in step c18 to the duty command generating unit 332.

When the output voltage command VD10ref of the DC-DC converter 405 is set in the same manner as in the first embodiment of the invention, even in a case where the input voltage V5 varies, it is possible to suppress a rapid variation of the output voltage V10.

In addition, the predetermined input current value, which is set as the input current limiting value ID15Lim of the DC-DC converter 405, is linearly raised with respect to the rising of the input voltage VD5 that is acquired, and is linearly lowered with respect to the lowering of the input voltage VD5. In addition, the predetermined input current value is linearly changed from 0 (zero) to the upper limit ID15HLim in accordance with the variation in the input voltage VD5.

When the input current limiting value ID15Lim of the DC-DC converter 405 is set as described above, even in a case where the input voltage V5 varies, it is possible to suppress a rapid variation of the input current I15. In addition, it is possible to limit the input current I15 regardless of a variation in a load current, and thus it is possible to lower the input current I15 in combination with the lowering of the input voltage V5. That is, it is possible to reduce electric power that is taken out from the high-voltage side battery 10 in combination with the lowering of the input voltage V5 regardless the magnitude of the load current, and thus it is possible to suppress over-discharging of the high-voltage side battery 10.

(Duty Generating Unit 332)

Figure 12:
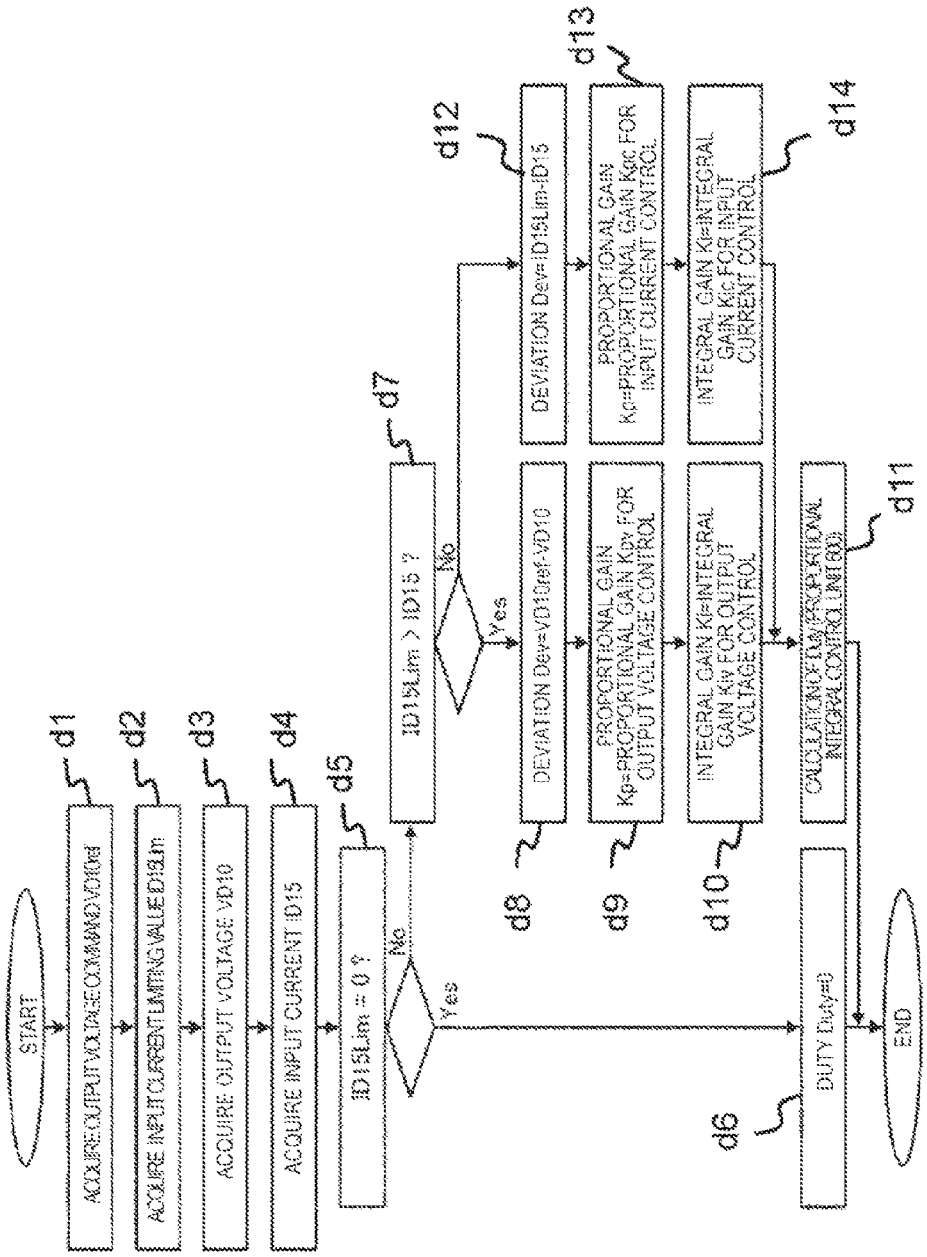
FIG. 12 is a view illustrating a duty generating unit 332 according to the second embodiment.

FIG. 12 is a view illustrating the duty generating unit 332 that is provided to the control device 315 of the DC-DC converter 405 according to the second embodiment of the invention. However, the configuration of the proportional integral control unit 600 that is provided to the command generating unit 327 of the control device 315 of the DC-DC converter 405 according to the second embodiment of the invention is the same as in the first embodiment, and thus description thereof will not be repeated. As illustrated in FIG. 10, the duty generating unit 332 acquires the output voltage command VD10ref and the input current limiting value ID15Lim of the DC-DC converter 405 which are output from the command generating unit 327, and the output voltage VD10 and the input current ID15 of the DC-DC converter 405 which are output from the A/D converter 320. Description will be made with reference to FIG. 12. In step d1, the duty generating unit 332 acquires the output voltage command VD10ref, acquires the input current limiting value ID15Lim in step d2, acquires the output voltage VD10 in step d3, and acquires the input current ID15 in step d4.

Next, in step d5, the duty generating unit 332 determines whether or not the input current limiting value ID15Lim of the DC-DC converter 405 which is acquired in step d2 is 0 (zero).

In a case where it is determined in step d5 that the input current limiting value ID15Lim of the DC-DC converter 405, which is acquired, is 0 (zero), in step d6, the duty generating unit 332 sets the duty Duty to 0 (zero). In addition, the duty generating unit 332 inputs the duty Duty, which is set, to the switching signal generating unit 335.

When the duty Duty is calculated as described above, it is possible to turn off all of the MOSFETs 210 to 280 which are switching elements of the DC-DC converter 405.

On the other hand, in a case where it is determined in step d5 that the input current limiting value ID15Lim of the DC-DC converter 405 which is acquired is not 0 (zero), in step d7, the duty generating unit 332 determines whether or not the input current limiting value ID15Lim of the DC-DC converter 405 that is acquired is greater than the input current ID15.

In a case where it is determined in step d7 that the input current limiting value ID15Lim of the DC-DC converter 405, which is acquired, is greater than the input current ID15, in step d8, the duty generating unit 332 calculates a deviation Dev by subtracting the output voltage VD10 from the output voltage command VD10ref of the DC-DC converter 405 which is acquired. In addition, in step d9, the duty generating unit 332 sets a proportional gain Kpv for output voltage control to a proportional gain Kp that is input to the proportional integral control unit 600 in the same manner as in the first embodiment of the invention. In addition, in step d10, the duty generating unit 332 sets an integral gain Kiv for output voltage control to an integral gain Ki.

In addition, in step d11, the duty generating unit 332 inputs the deviation Dev that is calculated in step d11, and the proportional gain Kp and the integral gain Ki which are set, to the proportional integral control unit 600, and calculates a duty Duty, which is configured to set the deviation Dev to 0 (zero), by the proportional integral control unit 600. In addition, the duty generating unit 332 inputs the duty Duty, which is calculated, to the switching signal generating unit 335.

When the duty Duty is calculated as described above, it is possible to make the output voltage VD10 of the DC-DC converter 405 match the output voltage command VD10ref.

On the other hand, in a case where it is determined in step d7 that the input current limiting value ID15Lim of the DC-DC converter 405, which is acquired, is equal to or less than the input current ID15, in step d12, the duty generating unit 332 calculates the deviation Dev by subtracting the input current ID15 from the input current limiting value ID15Lim of the DC-DC converter 405 which is acquired. In addition, in step d13, the duty generating unit 332 sets a proportional gain Kpci for input current control to the proportional gain Kp that is input to the proportional integral control unit 600. In addition, in step d14, the duty generating unit 332 sets an integral gain Kici for input current control to the integral gain Ki.

In addition, in step d11, the duty generating unit 332 inputs the deviation Dev that is calculated in step d11, and the proportional gain Kp and the integral gain Ki which are set, to the proportional integral control unit 600, and calculates a duty Duty, which is configured to set the deviation Dev to 0 (zero), by the proportional integral control unit 600. In addition, the duty generating unit 332 inputs the duty Duty, which is calculated, to the switching signal generating unit 335.

When the duty Duty is calculated as described above, it is possible to make the input current ID15 of the DC-DC converter 405 match the input current limiting value ID15Lim.

The configuration of the switching signal generating unit 335 and the gate drive circuit 340 which are provided to the control device 315 of the DC-DC converter 405 according to the second embodiment of the invention is the same as in the first embodiment, and thus description thereof will not be repeated.

(Relationship Between Input Voltage, Output Voltage, and Input Current)

Next, description will be given of a relationship between the input voltage V5, the output voltage V10, and the input current I15 of the DC-DC converter 405, which is obtained through application of the second embodiment of the invention, with reference to an example in FIG. 13 and FIG. 14.

(When Input Voltage Transitions from Second Region to First Region)

Figure 13:
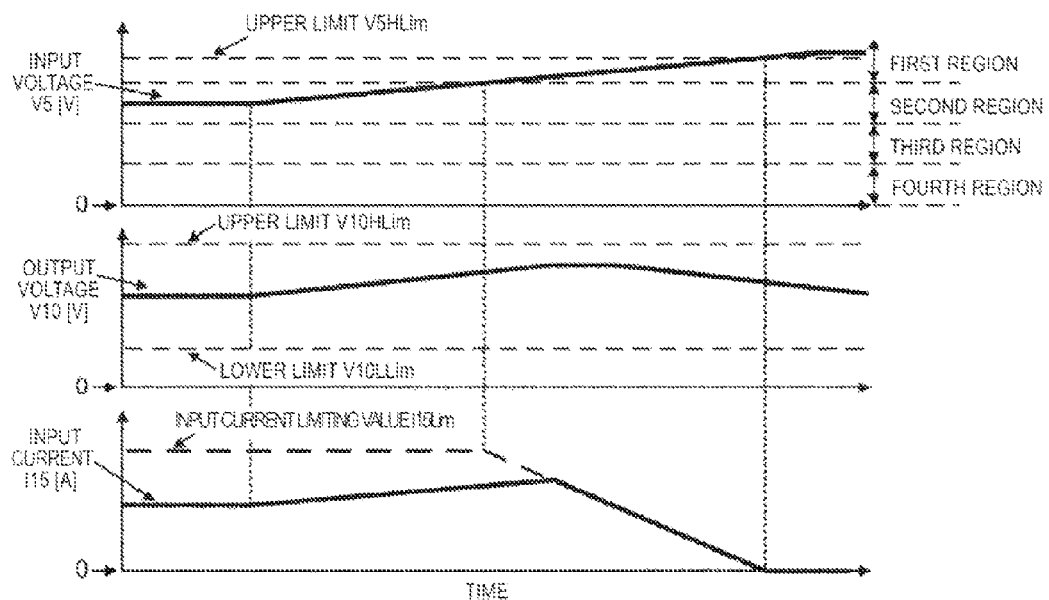
FIG. 13 is a view illustrating a relationship between an input voltage V5, an output voltage V10, and an input current I15 according to the second embodiment.

FIG. 13 is a view illustrating a relationship between the input voltage V5, the output voltage V10, and the input current I15 when the input voltage V5 transitions from the second region to the first region under conditions in which the output voltage V10 of the DC-DC converter 405 according to the second embodiment of the invention is greater than a lower limit V10LLim, and the load current is constant.

However, in FIG. 13, an upper limit V5HLim is a value that expresses a digital value of the upper limit VD5HLim as an analog value. An upper limit V10HLim is a value that expresses a digital value of the upper limit VD10HLim as an analog value. The lower limit V10LLim is a value that expresses a digital value of the lower limit VD10LLim as an analog value. An input current limiting value I15Lim is a value that expresses a digital value of the input current limiting value ID15Lim as an analog value.

In FIG. 13, at first, the input voltage V5 pertains to the second region. In a case where the input current limiting value I15Lim is greater than the input current I15, it enter a mode of controlling the output voltage V10. Accordingly, the output voltage V10 rises in combination with a rising of the input voltage V5.

In addition, when the input voltage V5 rises and reaches the first region, the input current limiting value I15Lim lowers in combination with the rising of the input voltage V5. Here, in a case where the input current limiting value I15Lim is greater than the input current I15, it enters the mode of controlling the output voltage V10 of the DC-DC converter 405, and thus the output voltage V10 rises continuously in combination with the rising of the input voltage V5.

On the other hand, in a case where the input current limiting value I15Lim is equal to or less than the input current I15, it enters a mode of controlling the input current I15 of the DC-DC converter 405, and thus the input current I15 lowers in combination with the rising of the input voltage V5.

In addition, in a case where a value obtained by converting the input current I15 into an output current is less than the load current, a current is supplied from the low-voltage side battery 100 to the load 110, and thus the output voltage V10 lowers in combination with the lowering of the input current I15.

In addition, when the input voltage V5 reaches an upper limit V5Lim, all of the MOSFETs 210 to 280 of the DC-DC converter 405 are turned off, and thus the input current I15 becomes 0 (zero).

(When Input Voltage Transitions from Third Region to Fourth Region)

Figure 14:
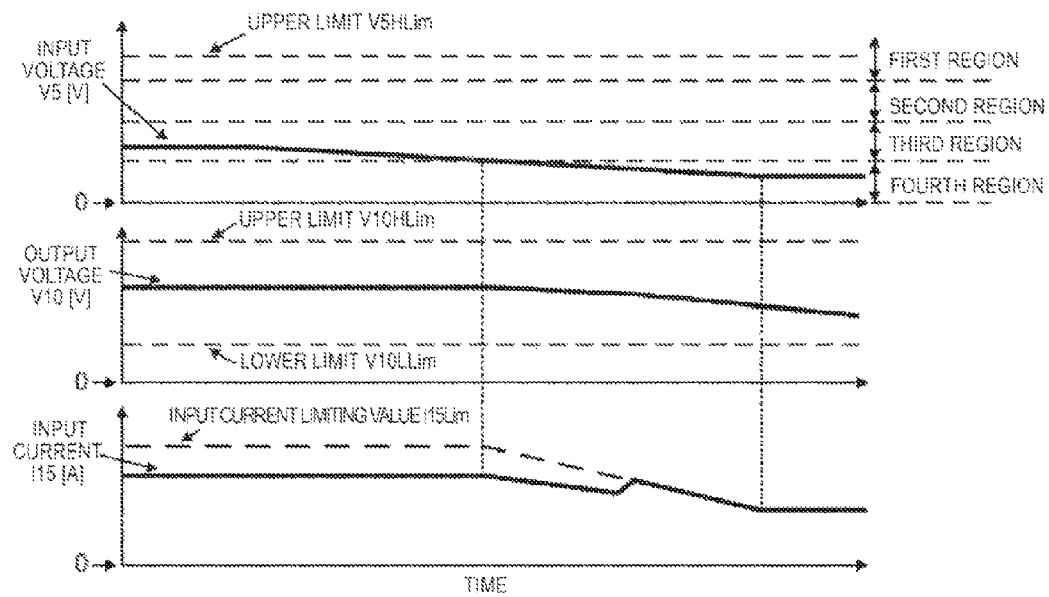
FIG. 14 is a view illustrating a relationship between the input voltage V5, the output voltage V10, and the input current I15 according to the second embodiment.

FIG. 14 is a view illustrating a relationship between the input voltage V5, the output voltage V10, and the input current I15 when the input voltage V5 transitions from the third region to the fourth region under conditions in which the output voltage V10 of the DC-DC converter 405 according to the second embodiment of the invention is greater than the lower limit V10LLim, and the load current rises.

In FIG. 14, at first, the input voltage V5 pertains to the third region. In a case where the input current limiting value I15Lim is greater than the input current I15, and the load current is constant, the output voltage V10 and the input current I15 are controlled to a constant value regardless of a variation in the input voltage V5.

In addition, when the input voltage V5 reaches the fourth region, the input current limiting value I15Lim lowers in combination with the lowering of the input voltage V5. Here, in a case where the input current limiting value I15Lim is greater than the input current I15, it enters the mode of controlling the output voltage V10 of the DC-DC converter 405, and thus the output voltage V10 lowers in combination with the lowering of the input voltage V5.

On the other hand, in a case where the input current limiting value I15Lim is equal to or less than the input current I15, it enters the mode of controlling the input current I15 of the DC-DC converter 405, and thus even in a case where the load current rises, it is possible to lower the input current I15 in combination with the rising of the input voltage V5.

In the related art, only the output voltage is controlled, and thus the input current rises in combination with the rising of the load current. However, in the invention, since the input current is limited in accordance with the magnitude of input voltage of the DC-DC converter, it is possible to lower the input current in combination with the lowering of the input voltage regardless of a variation in the load current.

In addition, when the value obtained by converting the input current I15 into the output current becomes less than the load current, a current is supplied from the low-voltage side battery 100 to the load 110, and thus the output voltage V10 lowers in combination with the lowering of the input current I15.

In addition, a method of limiting the input current of the above-described DC-DC converter is not limited to a circuit configuration of the DC-DC converter 405 which is illustrated in FIG. 9, and other circuit configurations can be applied. In addition, when this embodiment and the first embodiment of the invention are combined with each other, it is also possible to control any one of the input current and the output current of the DC-DC converter to a predetermined value in accordance with the magnitude of the input voltage of the DC-DC converter.

Third Embodiment

In the duty generating unit 330 that is provided to the control device 310 of the DC-DC converter 400 according to the first embodiment of the invention, the output voltage and the output current of the DC-DC converter 400 are controlled on the basis of a comparison result of the output current limiting value ID10Lim and the output current ID10.

In addition, in the duty generating unit 332 that is provided to the control device 315 of the DC-DC converter 405 according to the second embodiment of the invention, the output voltage and the input current of the DC-DC converter 405 are controlled on the basis of a comparison result of the input current limiting value ID15Lim and the input current ID15.

In this embodiment, an output voltage, and an input current or an output current of a DC-DC converter are controlled on the basis of a comparison result of an input current limiting value or an output current limiting value IDXLim, and an input current or an output current IDX. However, in the following description, for simplification of explanation, the input current limiting value or the output current limiting value IDXLim of the DC-DC converter, which is output from a command generating unit, is simply referred to as a current limiting value IDXLim. In addition, the input current or the output current IDX of the DC-DC converter, which is acquired, is simply referred to as a current IDX.

(Control Device 319 of DC-DC Converter)

Figure 15:
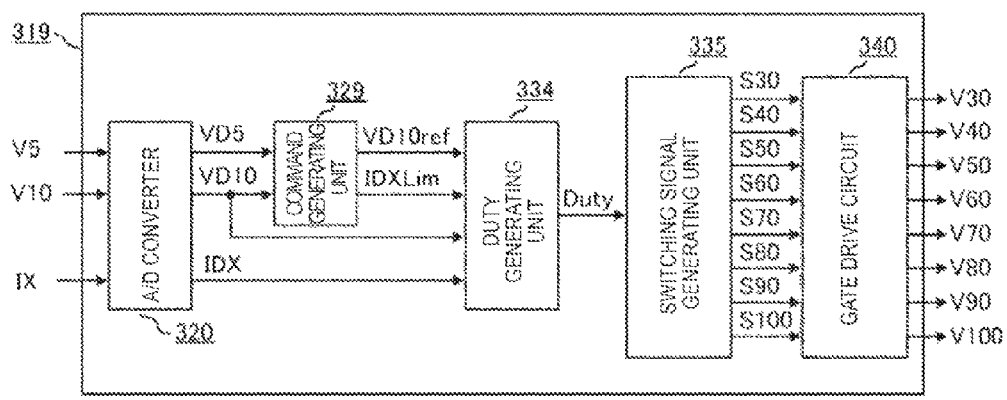
FIG. 15 is a view illustrating a control device 319 according to a third embodiment.

FIG. 15 is a view illustrating a control device 319 of a DC-DC converter according to a third embodiment of the invention. The control device 319 includes an A/D converter 320, a command generating unit 329, a duty generating unit 334, a switching signal generating unit 335, and a gate drive circuit 340.

The command generating unit 329 according to this embodiment generates an output voltage command VD10ref of a DC-DC converter, and an input current limiting value or an output current limiting value IDXLim (current limiting value IDXLim) of the DC-DC converter on the basis of a digital value VD5 (hereinafter, referred to as an input voltage VD5) that represents an input voltage V5 of the DC-DC converter which is detected by the voltage sensor 192, and a digital value VD10 (hereinafter, referred to as an output voltage VD10) that represents an output voltage V10 of the DC-DC converter which is detected by the voltage sensor 190. The configuration of the command generating unit 329 according to this embodiment is the same as in the first embodiment or the second embodiment, and thus description thereof will not be repeated.

In addition, the configuration of the DC-DC converter is the same as in the first embodiment or the second embodiment of the invention except for the command generating unit 329 and the duty generating unit 334 according to this embodiment, and thus description thereof will not be repeated.

(Duty Generating Unit 334)

Figure 16:
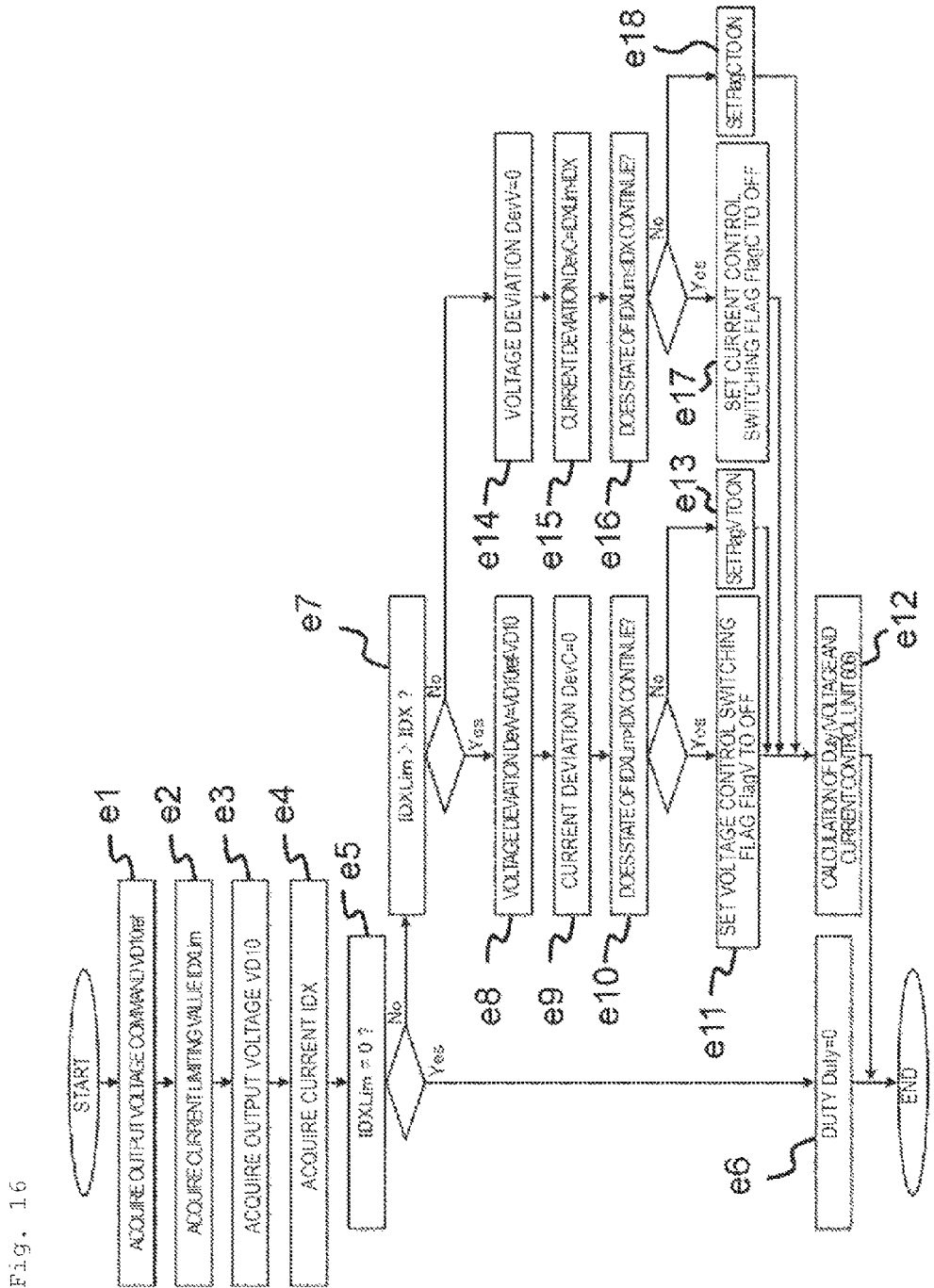
FIG. 16 is a view illustrating a duty generating unit 334 according to the third embodiment.

FIG. 16 is a view illustrating the duty generating unit 334 that is provided to the control device of the DC-DC converter according to the third embodiment of the invention. As illustrated in FIG. 15, the duty generating unit 334 acquires the output voltage command VD10ref and the current limiting value IDXLim of the DC-DC converter which are output from the command generating unit 329, and the output voltage VD10 and an current IDX of the DC-DC converter which are output from the A/D converter 320. Description will be made with reference to FIG. 16. The duty generating unit 334 acquires an output power command VD10ref in step e1, acquires the current limiting value IDXLim in step e2, acquires the output voltage VD10 in step e3, and acquires the current IDX in step e4.

Next, in step e5, the duty generating unit 334 determines whether or not the current limiting value IDXLim of the DC-DC converter, which is acquired in step e2, is 0 (zero).

In a case where it is determined in step e5 that the current limiting value IDXLim that is acquired is 0 (zero), in step e6, the duty generating unit 334 sets a duty Duty to 0 (zero). In addition, the duty generating unit 334 inputs the duty Duty, which is set, to the switching signal generating unit 335.

When the duty Duty is calculated as described above, it is possible to turn off all of MOSFETs which are switching elements of the DC-DC converter.

On the other hand, in a case where it is determined in step e5 that the current limiting value IDXLim that is acquired is not 0 (zero), in step e7, the duty generating unit 334 determines whether or not the current limiting value IDXLim is greater than the current IDX.

In a case where it is determined in step e7 that the current limiting value IDXLim is greater than the current IDX, in step e8, the duty generating unit 334 calculates a voltage deviation DevV by subtracting the output voltage VD10 from the output voltage command VD10ref of the DC-DC converter which is acquired. In addition, in step e9, the duty generating unit 334 sets a current deviation DevC to 0 (zero).

Next, in step e10, the duty generating unit 334 determines whether or not a state, in which the current limiting value IDXLim is greater than the current IDX, continues.

In a case where it is determined in step e10 that the state, in which the current limiting value IDXLim is greater than the current IDX, continues, that is, in a case where the current limiting value IDXLim acquired before one operation cycle is greater than the current IDX acquired before one operation cycle, in step e11, the duty generating unit 334 sets a voltage control switching flag FlagV to OFF. In addition, in step e12, the duty generating unit 334 inputs the voltage deviation DevV that is calculated in step e8, the current deviation DevC that is set in step e9, and the voltage control switching flag FlagV that is set in step e11 to a voltage and current control unit 606, and calculates a duty Duty, which is configured to set the voltage deviation DevV to 0 (zero), by the voltage and current control unit 606. In addition, the duty generating unit 334 inputs the calculated duty Duty to the switching signal generating unit 335.

On the other hand, in a case where it is determined in step e10 that the state, in which the current limiting value IDXLim is greater than the current IDX, does not continue, that is, the current limiting value IDXLim acquired before one operation cycle is equal to or less than the current IDX acquired before one operation cycle, in step e13, the duty generating unit 334 sets the voltage control switching flag FlagV to ON. In addition, in step e12, the duty generating unit 334 inputs the voltage deviation DevV that is calculated in step e8, the current deviation DevC that is set in step e9, and the voltage control switching flag FlagV that is set in step e13 to the voltage and current control unit 606, and calculates a duty Duty, which is configured to set the voltage deviation DevV to 0 (zero), by the voltage and current control unit 606. In addition, the duty generating unit 334 inputs the calculated duty Duty to the switching signal generating unit 335.

When the duty Duty is calculated as described above, it is possible to make the output voltage VD10 of the DC-DC converter match the output voltage command VD10ref.

On the other hand, in a case where it is determined in step e7 that the current limiting value IDXLim is equal to or less than the current IDX, in step e14, the duty generating unit 334 sets the voltage deviation DevV to 0 (zero). In addition, in step e15, the duty generating unit 334 calculates the current deviation DevC by subtracting the current IDX from the current limiting value IDXLim.

Next, in step e16, the duty generating unit 334 determines whether or not the state, in which the current limiting value IDXLim is equal to or less than the current IDX, continues.

In a case where it is determined in step e16 that the state, in which the current limiting value IDXLim is equal to or less than the current IDX, continues, that is, the current limiting value IDXLim acquired before one operation cycle is equal to or less than the current IDX acquired before one operation cycle, in step e17, the duty generating unit 334 sets a current control switching flag FlagC to OFF. In addition, in step e12, the duty generating unit 334 inputs the current deviation DevC that is calculated in step e15, the voltage deviation DevV that is set in step e14, and the current control switching flag FlagC that is set in step e17 to the voltage and current control unit 606, and calculates a duty Duty, which is configured to set the current deviation DevC to 0 (zero), by the voltage and current control unit 606. In addition, the duty generating unit 334 inputs the calculated duty Duty to the switching signal generating unit 335.

On the other hand, in a case where it is determined in step e16 that the state, in which the current limiting value IDXLim is equal to or less than the current IDX, does not continue, that is, in a case where the current limiting value IDXLim acquired before one operation cycle is greater than the current IDX acquired before one operation cycle, in step e18, the duty generating unit 334 sets the current control switching flag FlagC to ON. In addition, in step e12, the duty generating unit 334 inputs the current deviation DevC that is calculated in step e15, the voltage deviation DevV that is set in step e14, and the current control switching flag FlagC that is set in step e18 to the voltage and current control unit 606, and calculates the duty Duty, which is configured to set the current deviation DevC to 0 (zero), by the voltage and current control unit 606. In addition, the duty generating unit 334 inputs the calculated duty Duty to the switching signal generating unit 335.

When the duty Duty is calculated as described above, it is possible to make the input current or the output current IDX of the DC-DC converter match the input current limiting value or the output current limiting value IDXLim.

(Voltage and Current Control Unit 606)

Figure 17:
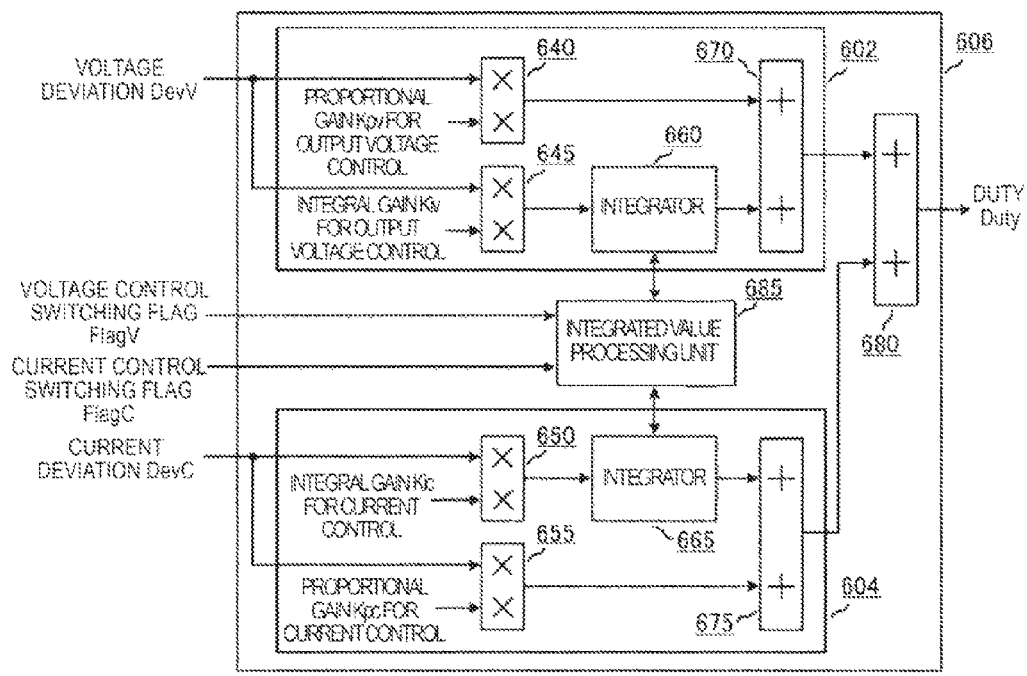
FIG. 17 is a view illustrating a voltage/current control unit 606 according to the third embodiment.

FIG. 17 is a view illustrating the voltage and current control unit 606 that is provided to the duty generating unit of the control device of the DC-DC converter according to the third embodiment of the invention. The voltage and current control unit 606 includes a proportional integral control unit 602 for output voltage control, a proportional integral control unit 604 (hereinafter, referred to as a proportional integral control unit 604 for current control) for input current control or output current control, an integrated value processing unit 685, and an adder 680.

The proportional integral control unit 602 for output voltage control includes a multiplier 640, a multiplier 645, an integrator 660, and an adder 670. The proportional integral control unit 604 for current control includes a multiplier 650, a multiplier 655, an integrator 665, and an adder 675.

First, the voltage and current control unit 606 acquires the voltage deviation DevV, the current deviation DevC, the voltage control switching flag FlagV, and the current control switching flag FlagC. In addition, the voltage and current control unit 606 inputs the voltage deviation DevV, which is acquired, to the proportional integral control unit 602 for output voltage control. In addition, the voltage and current control unit 606 inputs the current deviation DevC, which is acquired, to the proportional integral control unit 604 for current control. In addition, the voltage and current control unit 606 inputs the voltage control switching flag FlagV and the current control switching flag FlagC, which are acquired, to the integrated value processing unit 685.

In a case where the voltage control switching flag FlagV, which is input, is ON, the integrated value processing unit 685 sets an integrated value of the integrator 665, which is provided to the proportional integral control unit 604 for current control, to an integrated value of the integrator 660 that is provided to the proportional integral control unit 602 for output voltage control. In addition, after the above-described setting is completed, the integrated value processing unit 685 sets an integrated value of the integrator 665, which is provided to the proportional integral control unit 604 for current control, to 0 (zero).

In addition, in a case where the current control switching flag FlagC, which is input, is ON, the integrated value processing unit 685 sets an integrated value of an integrator 660, which is provided to the proportional integral control unit 602 for output voltage control, to an integrated value of the integrator 665 which is provided to the proportional integral control unit 604 for current control. In addition, after the above-described setting is completed, the integrated value processing unit 685 sets the integrated value of the integrator 660, which is provided to the proportional integral control unit 602 for output voltage control, to 0 (zero).

Next, the proportional integral control unit 602 for output voltage control inputs the voltage deviation DevV, which is input, to the multiplier 640 and the multiplier 645. The multiplier 640 multiplies the voltage deviation DevV that is input, and the proportional gain Kpv for output voltage control. A value obtained through multiplication by the multiplier 640 is input to the adder 670. The multiplier 645 multiplies the voltage deviation DevV that is input, and the integral gain Kiv for output voltage control. A value obtained through multiplication by the multiplier 645 is input to the integrator 660.

The integrator 660 integrates multiplied values which are input from the multiplier 645. A value obtained through integration by the integrator 645 is input to the adder 670. The adder 670 adds the multiplied value input from the multiplier 640, and the integrated value that is input from the integrator 660 to calculate a duty DutyV for output voltage control. The duty DutyV for output voltage control, which is calculated, is input to the adder 680 that is provided to the voltage and current control unit 606.

In addition, the proportional integral control unit 604 for current control inputs the current deviation DevC, which is input, to the multiplier 650 and the multiplier 655. The multiplier 650 multiplies the current deviation DevC that is input, and the integral gain Kic for current control. A value obtained through multiplication by the multiplier 650 is input to the integrator 665. The multiplier 655 multiplies the current deviation DevC that is input, and the proportional gain Kpc for current control. A value obtained through multiplication by the multiplier 655 is input to the adder 675.

The integrator 665 integrates multiplied values which are input from the multiplier 650. A value obtained through integration by the integrator 665 is input to the adder 675. The adder 675 adds the integrated value that is input from the integrator 665, and the multiplied value that is input from the multiplier 655 to calculate duty DutyC for current control. The duty DutyC for current control, which is calculated, is input to the adder 680 that is provided to the voltage and current control unit 606.

In addition, the adder 680, which is provided to the voltage and current control unit 606, adds the duty DutyV for output voltage control which is input from the adder 670, and the duty DutyC for current control which is input from the adder 675. The duty Duty that is added in the adder 675 is input to the switching signal generating unit 335.

When the duty Duty is calculated as described above, in a case where the current limiting value IDXLim of the DC-DC converter is greater than the current IDX, the duty DutyC for current control becomes 0 (zero), and thus the duty Duty for output voltage control is input to the switching signal generating unit 335. In addition, in a case where the current limiting value IDXLim is equal to or less than the current IDX, the duty DutyV for output voltage control becomes 0 (zero), and thus the duty DutyC for current control is input to the switching signal generating unit 335.

According to this, in a case where the input current limiting value or the output current limiting value IDXLim of the DC-DC converter is greater than the input current or the output current IDX of the DC-DC converter, it is possible to make the output voltage VD10 of the DC-DC converter match the output voltage command VD10ref. In addition, in a case where the input current limiting value or the output current limiting value IDXLim of the DC-DC converter is equal to or less than the input current or the output current IDX of the DC-DC converter, it is possible to make the input current or the output current IDX of the DC-DC converter match the input current limiting value or the output current limiting value IDXLim.

In addition, in the embodiments as described above, the output voltage control and the current control do not interfere each other, and thus it is possible to set responsiveness of the output voltage control to a high speed. Accordingly, in this embodiment, even in a case where disturbance such as a rapid variation in the load current occurs, it is possible to obtain a stable output voltage without a rapid variation of the output voltage.

REFERENCE SIGNS LIST

10: High-voltage side battery
20: Filter capacitor
25: Snubbing capacitor
30: Resonant inductor
40: Primary side winding of transformer
50: Transformer
60: Secondary side winding of transformer
70: Secondary side winding of transformer
80: Smoothing inductor
90: Smoothing capacitor
100: Low-voltage side battery
110: Load
190: Voltage sensor
192: Voltage sensor
200: Current sensor
205: Current sensor
210: MOSFET
220: MOSFET
230: MOSFET
240: MOSFET
250: MOSFET
260: MOSFET
270: MOSFET
280: MOSFET
310: Control device of DC-DC converter
315: Control device of DC-DC converter
319: Control device of DC-DC converter
320: A/D converter
325: Command generating unit
327: Command generating unit
329: Command generating unit
330: Duty generating unit
332: Duty generating unit
334: Duty generating unit
335: Switching signal generating unit
340: Gate drive circuit
360: Motor generator shaft
365: Transmission
370: Crank shaft
375: Engine
380: Propeller shaft

400: DC-DC converter
405: DC-DC converter
500: Inverter
510: Motor generator
520: Differential gear
530: Drive shaft
540: Driving wheel
600: Proportional integral control unit
602: Proportional integral control unit
604: Proportional integral control unit
606: Voltage and current control unit
610: Multiplier
615: Multiplier
640: Multiplier
645: Multiplier
650: Multiplier
655: Multiplier
620: Integrator
660: Integrator
665: Integrator
630: Adder
670: Adder
675: Adder
680: Adder
685: Integrated value processing unit
S30: ON/OFF signal
S40: ON/OFF signal
S50: ON/OFF signal
S60: ON/OFF signal
S70: ON/OFF signal
S80: ON/OFF signal
S90: ON/OFF signal
S100: ON/OFF signal
V30: Gate voltage
V40: Gate voltage
V50: Gate voltage
V60: Gate voltage
V70: Gate voltage
V80: Gate voltage
V90: Gate voltage
V100: Gate voltage
Duty: Duty
DutyC: Duty for input current control or output current control
DutyV: Duty for output voltage control
Dev: Deviation
DevC: Current deviation
DevV: Voltage deviation
Fsw: Switching frequency
FlagC: Current control switching flag
FlagV: Voltage control switching flag
I10: Output current
I10Lim: Output current limiting value
ID10: Digital value of output current
ID10Lim: Digital value of output current limiting value
ID10HLim: Digital value of upper limit of output current
I15: Input current
I15Lim: Input current limiting value
ID15: Digital value of input current
ID15Lim: Digital value of input current limiting value
ID15HLim: Digital value of upper limit of input current
IX: Input current or Output current
IDX: Digital value of input current or output current
IDXLim: Digital value of input current limiting value or output current limiting value
V5: Input voltage
V5HLim: Upper limit of input voltage
VD5: Digital value of input voltage
VD5HLim: Digital value of upper limit with respect to input voltage
V10: Output voltage
V10HLim: Upper limit of output voltage
V10LLim: Lower limit of output voltage
VD10: Digital value of output voltage
VD10HLim: Digital value of upper limit of output voltage
VD10LLim: Digital value of lower limit of output voltage
VD10ref: Output voltage command
VD10St: Reference voltage value with respect to output voltage

The invention claimed is:

1. A control device of a DC-DC converter that is constituted by a primary side circuit that is electrically connected between an input side and a transformer, and a secondary side circuit that is electrically connected between an output side and the transformer, comprising:
a command generating unit that sets an output current limiting value of the secondary side circuit to a predetermined value on the basis of a detected input voltage of the primary side circuit;
a duty generating unit that calculates a duty configured to turn ON/OFF a switching element that constitutes the primary side circuit on the basis of the output current limiting value that is set by the command generating unit, and a detected output current of the secondary side circuit; and
a switching signal generating unit that generates a switching signal of the primary side circuit on the basis of the duty that is calculated by the duty generating unit,
wherein the duty generating unit generates the duty in such a manner that the output current of the secondary side circuit is limited to the output current limiting value or less.

2. The control device of a DC-DC converter according to claim 1,
wherein the command generating unit sets an output voltage command of the secondary side circuit to a value, which is determined in advance, on the basis of the detected input voltage,
the duty generating unit compares the output current limiting value that is set by the command generating unit, and the detected output current,
in a case where the output current limiting value that is set by the command generating unit is equal to or less than the detected output current, the duty generating unit calculates a duty for output current control so that an output current of the secondary side circuit matches the output current limiting value that is set by the command generating unit,
in a case where the output current limiting value that is set by the command generating unit is greater than the detected output current, the duty generating unit calculates a duty for output voltage control so that an output voltage of the secondary side circuit matches the output voltage command that is set by the command generating unit, and
the switching signal generating unit generates the switching signal on the basis of any one of the duty for output current control duty and the duty for output voltage control which are calculated by the duty generating unit.

3. The control device of a DC-DC converter according to claim 2, wherein the duty generating unit includes a proportional integral control unit that calculates the duty on the basis of a deviation and a gain which are calculated by the duty generating unit, in a case where the output current limiting value, which is set by the command generating unit, is equal to or less than the detected output current, the duty generating unit inputs a difference between the output current limiting value and the detected output current to the proportional integral control unit as the deviation, and inputs a predetermined gain for output current control to the proportional integral control unit as the gain, and in a case where the output current limiting value, which is set by the command generating unit, is greater than the detected output current, the duty generating unit inputs a difference between the output voltage command and the detected output voltage to the proportional integral control unit as the deviation, and inputs a predetermined gain for output voltage control to the proportional integral control unit as the gain.

4. The control device of a DC-DC converter according to claim 2, wherein in a case where the detected input voltage is greater than a first predetermined voltage, the command generating unit sets the output voltage command so that the output voltage command rises with respect to a rising of the detected input voltage, and sets the output current limiting value so that the output current limiting value lowers with respect to the rising of the detected input voltage.

5. The control device of a DC-DC converter according to claim 4, wherein in a case where the detected input voltage is equal to or less than the first predetermined voltage, and is greater than a second predetermined voltage that is less than the first predetermined voltage, the command generating unit sets the output current limiting value to an upper limit that is equal to or greater than the output current limiting value in a case where the detected input voltage is greater than the first predetermined voltage.

6. The control device of a DC-DC converter according to claim 5, wherein in a case where the detected input voltage is equal to or less than the second predetermined voltage, and is greater than a third predetermined voltage that is less than the second predetermined voltage, the command generating unit sets the output voltage command to a predetermined reference voltage value.

7. The control device of a DC-DC converter according to claim 6, wherein in a case where the detected input voltage is equal to or less than the third predetermined voltage, the command generating unit sets the output voltage command so that the output voltage command rises with respect to the rising of the detected input voltage, and sets the output current limiting value so that the output current limiting value rises with respect to the rising of the detected input voltage.

8. A control device of a DC-DC converter that is constituted by a primary side circuit that is electrically connected between an input side and a transformer, and a secondary side circuit that is electrically connected between an output side and the transformer, comprising:

a command generating unit that sets an input current limiting value of the primary side circuit to a predetermined value on the basis of a detected input voltage of the primary side circuit;

a duty generating unit that calculates a duty configured to turn ON/OFF a switching element that constitutes the primary side circuit on the basis of the input current limiting value that is set by the command generating unit, and the a detected input current of the primary side circuit; and a switching signal generating unit that generates a switching signal of the primary side circuit on the basis of the duty that is calculated by the duty generating unit, wherein the duty generating unit generates the duty so that the input current of the primary side circuit is limited to the input current limiting value or less.

9. The control device of a DC-DC converter according to claim 8, wherein the command generating unit sets an output voltage command of the secondary side circuit to a value, which is determined in advance, on the basis of the detected input voltage, the duty generating unit compares the input current limiting value that is set by the command generating unit, and the detected input current, in a case where the input current limiting value that is set by the command generating unit is equal to or less than the detected input current, the duty generating unit calculates a duty for input current control so that an input current of the primary side circuit matches the input current limiting value that is set by the command generating unit, in a case where the input current limiting value that is set by the command generating unit is greater than the detected input current, the duty generating unit calculates a duty for output voltage control so that an output voltage of the secondary side circuit matches the output voltage command that is set by the command generating unit, and the switching signal generating unit generates the switching signal on the basis of any one of the duty for input current control duty and the duty for output voltage control which are calculated by the duty generating unit.

10. The control device of a DC-DC converter according to claim 9, wherein the duty generating unit includes a proportional integral control unit that calculates the duty on the basis of a deviation and a gain which are calculated by the duty generating unit, in a case where the input current limiting value, which is set by the command generating unit, is equal to or less than the detected input current, the duty generating unit inputs a difference between the input current limiting value and the detected input current to the proportional integral control unit as the deviation, and inputs a predetermined gain for input current control to the proportional integral control unit as the gain, and in a case where the input current limiting value, which is set by the command generating unit, is greater than the detected input current, the duty generating unit inputs a difference between the output voltage command and the detected output voltage to the proportional integral control unit as the deviation, and inputs a predetermined gain for output voltage control to the proportional integral control unit as the gain.

11. The control device for a DC-DC converter according to claim 9, wherein in a case where the detected input voltage is greater than a first predetermined voltage, the command generating unit sets the output voltage command so that the output voltage command rises with respect to a rising of the detected input voltage, and sets the input current limiting value so that the input current limiting value lowers with respect to the rising of the detected input voltage.

12. The control device of a DC-DC converter according to claim 11,
wherein in a case where the detected input voltage is equal to or less than the first predetermined voltage, and is greater than a second predetermined voltage that is less than the first predetermined voltage, the command generating unit sets the input current limiting value to an upper limit that is equal to or greater than the input current limiting value in a case where the detected input voltage is greater than the first predetermined voltage.

13. The control device of a DC-DC converter according to claim 12,
wherein in a case where the detected input voltage is equal to or less than the second predetermined voltage, and is greater than a third predetermined voltage that is less than the second predetermined voltage, the command generating unit sets the output voltage command to a predetermined reference voltage value.

14. The control device of a DC-DC converter according to claim 13,
wherein in a case where the detected input voltage is equal to or less than the third predetermined voltage, the command generating unit sets the output voltage command so that the output voltage command rises with respect to the rising of the detected input voltage, and sets the input current limiting value so that the input current limiting value rises with respect to the rising of the detected input voltage.

\* \* \* \* \*